(12) United States Patent
Masuda et al.

(10) Patent No.: US 11,502,478 B2
(45) Date of Patent: Nov. 15, 2022

(54) LASER APPARATUS, LASER APPARATUS MANAGEMENT SYSTEM, AND LASER APPARATUS MANAGEMENT METHOD

(71) Applicant: Gigaphoton Inc., Tochigi (JP)

(72) Inventors: Hiroyuki Masuda, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 342 days.

(21) Appl. No.: 16/674,918

(22) Filed: Nov. 5, 2019

(65) Prior Publication Data

US 2020/0067259 A1 Feb. 27, 2020

Related U.S. Application Data

(63) Continuation of application No. PCT/JP2017/021620, filed on Jun. 12, 2017.

(51) Int. Cl.
*H01S 3/13* (2006.01)
*H01S 3/134* (2006.01)

(52) U.S. Cl.
CPC ............ *H01S 3/1305* (2013.01); *H01S 3/134* (2013.01)

(58) Field of Classification Search
CPC .... H01S 3/1305; H01S 3/134; H01S 3/10069; H01S 3/139
See application file for complete search history.

(56) References Cited

U.S. PATENT DOCUMENTS

| | | |
|---|---|---|
| 6,618,425 B1 | 9/2003 | Carlesi et al. |
| 6,697,695 B1 | 2/2004 | Kurihara et al. |
| 7,023,885 B1 | 4/2006 | Toki |
| 2002/0105983 A1 | 8/2002 | Nomura |
| 2004/0186609 A1 | 9/2004 | Patel et al. |
| 2006/0114958 A1 | 6/2006 | Trintchouk et al. |
| 2013/0315270 A1* | 11/2013 | Kumazaki ............... H01S 3/137 372/20 |

(Continued)

FOREIGN PATENT DOCUMENTS

| | | |
|---|---|---|
| CN | 102133687 A | 7/2011 |
| CN | 102473615 A | 5/2012 |

(Continued)

OTHER PUBLICATIONS

An Office Action mailed by China National Intellectual Property Administration dated Mar. 19, 2021, which corresponds to Chinese Patent Application No. 201780090870.4 and is related to U.S. Appl. No. 16/674,918 with English language translation.

(Continued)

*Primary Examiner* — Yuanda Zhang
(74) *Attorney, Agent, or Firm* — Studebaker & Brackett PC

(57) ABSTRACT

A laser apparatus according to the present disclosure includes: a laser output unit configured to perform laser oscillation; and a control unit configured to acquire first laser performance data obtained when the laser output unit performs laser oscillation based on a first laser control parameter, and second laser performance data obtained when the laser output unit performs laser oscillation based on a second laser control parameter, while laser output from the laser output unit to an external device is stopped, and determine whether the second laser performance data has been improved as compared to the first laser performance data.

29 Claims, 22 Drawing Sheets

(56) References Cited

U.S. PATENT DOCUMENTS

| | | | |
|---|---|---|---|
| 2015/0003485 A1* | 1/2015 | Abe | .................... H01S 3/09702 |
| | | | 372/57 |
| 2015/0188274 A1 | 7/2015 | Wakabayashi et al. | |
| 2016/0141823 A1 | 5/2016 | Nishio | |
| 2016/0226213 A1 | 8/2016 | Yuda et al. | |
| 2016/0248219 A1* | 8/2016 | Wakabayashi | ........ H01S 3/2375 |

FOREIGN PATENT DOCUMENTS

| | | | |
|---|---|---|---|
| CN | 104037596 A | 9/2014 |
| CN | 105846291 A | 8/2016 |
| JP | H07-142801 A | 6/1995 |
| JP | H07-249818 A | 9/1995 |
| JP | 2000-306813 A | 11/2000 |
| JP | 2001-023888 A | 1/2001 |
| JP | 2002-015986 A | 1/2002 |
| JP | 2002-043219 A | 2/2002 |
| JP | 2002-237649 A | 8/2002 |
| JP | 2003-514403 A | 4/2003 |
| JP | 2003-347636 A | 12/2003 |
| JP | 2006-024765 A | 1/2006 |
| WO | 2014003018 A1 | 1/2014 |

OTHER PUBLICATIONS

International Search Report issued in PCT/JP2017/021620; dated Sep. 5, 2017.
International Preliminary Report on Patentability and Written Opinion issued in PCT/JP2017/021620; dated Dec. 17, 2019.

\* cited by examiner

Fig. 3

| CONTROL PARAMETER TYPE | CONTROL TYPE | CONTROL PARAMETER | DESCRIPTION OF CONTROL PARAMETER | TARGET DATA |
|---|---|---|---|---|
| GAS CONTROL PARAMETER | GAS PRESSURE CONTROL PARAMETER | MINIMUM CHARGE VOLTAGE Vmin | MINIMUM VALUE OF CHARGE VOLTAGE V | TARGET PULSE ENERGY Et (INDIRECT) |
| | | MAXIMUM CHARGE VOLTAGE Vmax | MAXIMUM VALUE OF CHARGE VOLTAGE V | |
| | | MAXIMUM CONTROL GAS PRESSURE Pmax | MAXIMUM GAS PRESSURE IN LASER CHAMBER AT LASER OPERATION | |
| | | GAS PRESSURE VARIABLE AMOUNT $\Delta P$ | PRESSURE CHANGE AMOUNT BY WHICH GAS PRESSURE P IS INCREASED/DECREASED | |
| | PARTIAL GAS REPLACEMENT CONTROL PARAMETER | PARTIAL GAS REPLACEMENT PERIOD Tpg | PERIOD AT WHICH PARTIAL GAS REPLACEMENT IS PERFORMED | |
| | | BUFFER GAS INJECTION COEFFICIENT Kpg | INJECTION AMOUNT OF "Ar+Ne" MIXED GAS PER UNIT PULSE | |
| | | FLUORINE-CONTAINING GAS INJECTION COEFFICIENT Khg | INJECTION AMOUNT OF "Ar+Ne+$F_2$" MIXED GAS PER UNIT PULSE | |
| SPECTRUM CONTROL PARAMETER | WAVELENGTH CONTROL PARAMETER | WAVELENGTH CONTROL GAIN $\lambda k$ | $\lambda k = \Delta\theta/\delta\lambda$<br>$\Delta\theta$: CHANGE OF ROTATION STAGE ANGLE<br>$\delta\lambda$: CHANGE OF WAVELENGTH | TARGET WAVELENGTH $\lambda t$ |
| | | ROTATION STAGE INITIAL ANGLE $\theta 0$ | INITIAL ROTATION ANGLE OF PRISM | |
| | SPECTRUM LINE WIDTH CONTROL PARAMETER | SPECTRUM LINE WIDTH CONTROL GAIN $\Delta\lambda k$ | $\Delta\lambda k = \Delta X/\Delta\lambda$<br>$\Delta X$: CHANGE OF LINEAR STAGE POSITION<br>$\Delta\lambda$: CHANGE OF SPECTRUM LINE WIDTH | TARGET SPECTRUM LINE WIDTH $\Delta\lambda t$ |
| | | LINEAR STAGE INITIAL POSITION X0 | INITIAL POSITION OF CYLINDRICAL LENS | |
| ENERGY CONTROL PARAMETER | | ENERGY CONTROL GAIN Vk | $Vk = \Delta V/\Delta E$<br>$\Delta V$: CHANGE OF CHARGE VOLTAGE V<br>$\Delta E$: CHANGE OF PULSE ENERGY E | TARGET PULSE ENERGY Et |
| | | INITIAL VALUE V0 OF CHARGE VOLTAGE V | INITIAL VALUE OF CHARGE VOLTAGE V | |

Fig. 19

| CONTROL PARAMETER TYPE | CONTROL PARAMETER | CONTROL PARAMETER BEFORE CONTROL PARAMETER CHANGE | CONTROL PARAMETER AFTER CONTROL PARAMETER CHANGE |
|---|---|---|---|
| GAS CONTROL PARAMETER | MINIMUM CHARGE VOLTAGE Vmin | Vmina | Vminb |
| | MAXIMUM CHARGE VOLTAGE Vmax | Vmaxa | Vmaxb |
| | GAS PRESSURE VARIABLE AMOUNT $\Delta P$ | $\Delta Pa$ | $\Delta Pb$ |
| | PARTIAL GAS REPLACEMENT PERIOD Tpg | Tpga | Tpgb |
| | BUFFER GAS INJECTION COEFFICIENT Kpg | Kpga | Kpgb |
| | FLUORINE-CONTAINING GAS INJECTION COEFFICIENT Khg | Khga | Khgb |
| SPECTRUM CONTROL PARAMETER | WAVELENGTH CONTROL GAIN $\lambda k$ | $\lambda ka$ | $\lambda kb$ |
| | ROTATION STAGE INITIAL ANGLE $\theta 0$ | $\theta 0a$ | $\theta 0b$ |
| | SPECTRUM LINE WIDTH CONTROL GAIN $\Delta\lambda k$ | $\Delta\lambda ka$ | $\Delta\lambda kb$ |
| | LINEAR STAGE INITIAL POSITION X0 | X0a | X0b |
| ENERGY CONTROL PARAMETER | ENERGY CONTROL GAIN Vk | Vka | Vkb |
| | INITIAL VALUE V0 OF CHARGE VOLTAGE V | V0a | V0b |

Fig. 20

| SHOT NUMBER FROM START OF ADJUSTMENT OSCILLATION BEFORE AND AFTER CHANGE | ELAPSED TIME Ta FROM START TIME OF ADJUSTMENT OSCILLATION BEFORE CHANGE | ELAPSED TIME Tb FROM START TIME OF ADJUSTMENT OSCILLATION AFTER CHANGE | ENERGY CONTROL RELATED LASER PERFORMANCE DATA ||||||||
|---|---|---|---|---|---|---|---|---|---|
| | | | TARGET PULSE ENERGY Et | PULSE ENERGY Ea BEFORE CHANGE | PULSE ENERGY Eb AFTER CHANGE | ENERGY STABILITY Eσa(%) BEFORE CHANGE | ENERGY STABILITY Eσb(%) AFTER CHANGE | CHARGE VOLTAGE Va BEFORE CHANGE | CHARGE VOLTAGE Vb AFTER CHANGE |
| Shot (1) | Ta(1) | Tb(1) | Et(1) | Ea(1) | Eb(1) | — | — | Va(1) | Vb(1) |
| Shot (2) | Ta(2) | Tb(2) | Et(2) | Ea(2) | Eb(2) | — | — | Va(2) | Vb(2) |
| Shot (3) | Ta(3) | Tb(3) | Et(3) | Ea(3) | Eb(3) | — | — | Va(3) | Vb(3) |
| Shot (4) | Ta(4) | Tb(4) | Et(4) | Ea(4) | Eb(4) | — | — | Va(4) | Vb(4) |
| Shot (5) | Ta(5) | Tb(5) | Et(5) | Ea(5) | Eb(5) | — | — | Va(5) | Vb(5) |
| Shot (6) | Ta(6) | Tb(6) | Et(6) | Ea(6) | Eb(6) | — | — | Va(6) | Vb(6) |
| Shot (7) | Ta(7) | Tb(7) | Et(7) | Ea(7) | Eb(7) | — | — | Va(7) | Vb(7) |
| Shot (8) | Ta(8) | Tb(8) | Et(8) | Ea(8) | Eb(8) | — | — | Va(8) | Vb(8) |
| · | · | | · | · | · | Eσa(n-3) | Eσb(n-3) | · | · |
| · | · | | · | · | · | Eσa(n-2) | Eσb(n-2) | · | · |
| · | · | | · | · | · | Eσa(n-1) | Eσb(n-1) | · | · |
| Shot (n) | Ta(n) | Tb(n) | Et(n) | Ea(n) | Eb(n) | Eσa(n) | Eσb(n) | Va(n) | Vb(n) |
| · | · | | | · | · | · | · | | |
| · | · | | | · | · | · | · | | |
| DETERMINATION | | | | NG | OK | NG | OK | | |

Fig. 21

| | | | SPECTRUM CONTROL RELATED LASER PERFORMANCE DATA | | | | | | | | | |
|---|---|---|---|---|---|---|---|---|---|---|---|---|
| SHOT NUMBER | ELAPSED TIME Ta | ELAPSED TIME Tb | TARGET WAVE-LENGTH $\lambda t$ | DIFFERENCE $\delta\lambda a$ FROM TARGET WAVELENGTH BEFORE CHANGE | DIFFERENCE $\delta\lambda b$ FROM TARGET WAVELENGTH AFTER CHANGE | WAVE-LENGTH STABILITY $\lambda\sigma a$ BEFORE CHANGE | WAVE-LENGTH STABILITY $\lambda\sigma b$ AFTER CHANGE | TARGET SPECTRUM LINE WIDTH $\Delta\lambda t$ | SPECTRUM LINE WIDTH $\Delta\lambda a$ BEFORE CHANGE | SPECTRUM LINE WIDTH $\Delta\lambda b$ AFTER CHANGE | SPECTRUM LINE WIDTH STABILITY $\Delta\lambda\sigma a$ BEFORE CHANGE | SPECTRUM LINE WIDTH STABILITY $\Delta\lambda\sigma b$ AFTER CHANGE |
| Shot(1) | Ta(1) | Tb(1) | $\lambda t(1)$ | $\delta\lambda a(1)$ | $\delta\lambda b(1)$ | — | — | $\Delta\lambda t(1)$ | $\Delta\lambda a(1)$ | $\Delta\lambda b(1)$ | — | — |
| Shot(2) | Ta(2) | Tb(2) | $\lambda t(2)$ | $\delta\lambda a(2)$ | $\delta\lambda b(2)$ | — | — | $\Delta\lambda t(2)$ | $\Delta\lambda a(2)$ | $\Delta\lambda b(2)$ | — | — |
| Shot(3) | Ta(3) | Tb(3) | $\lambda t(3)$ | $\delta\lambda a(3)$ | $\delta\lambda b(3)$ | — | — | $\Delta\lambda t(3)$ | $\Delta\lambda a(3)$ | $\Delta\lambda b(3)$ | — | — |
| Shot(4) | Ta(4) | Tb(4) | $\lambda t(4)$ | $\delta\lambda a(4)$ | $\delta\lambda b(4)$ | — | — | $\Delta\lambda t(4)$ | $\Delta\lambda a(4)$ | $\Delta\lambda b(4)$ | — | — |
| Shot(5) | Ta(5) | Tb(5) | $\lambda t(5)$ | $\delta\lambda a(5)$ | $\delta\lambda b(5)$ | — | — | $\Delta\lambda t(5)$ | $\Delta\lambda a(5)$ | $\Delta\lambda b(5)$ | — | — |
| Shot(6) | Ta(6) | Tb(6) | $\lambda t(6)$ | $\delta\lambda a(6)$ | $\delta\lambda b(6)$ | — | — | $\Delta\lambda t(6)$ | $\Delta\lambda a(6)$ | $\Delta\lambda b(6)$ | — | — |
| Shot(7) | Ta(7) | Tb(7) | $\lambda t(7)$ | $\delta\lambda a(7)$ | $\delta\lambda b(7)$ | — | — | $\Delta\lambda t(7)$ | $\Delta\lambda a(7)$ | $\Delta\lambda b(7)$ | — | — |
| Shot(8) | Ta(8) | Tb(8) | $\lambda t(8)$ | $\delta\lambda a(8)$ | $\delta\lambda b(8)$ | — | — | $\Delta\lambda t(8)$ | $\Delta\lambda a(8)$ | $\Delta\lambda b(8)$ | — | — |
| · | · | · | · | · | · | $\lambda\sigma a(n-3)$ | $\lambda\sigma b(n-3)$ | · | · | · | $\Delta\lambda\sigma a(n-3)$ | $\Delta\lambda\sigma b(n-3)$ |
| · | · | · | · | · | · | $\lambda\sigma a(n-2)$ | $\lambda\sigma b(n-2)$ | · | · | · | $\Delta\lambda\sigma a(n-2)$ | $\Delta\lambda\sigma b(n-2)$ |
| · | · | · | · | · | · | $\lambda\sigma a(n-1)$ | $\lambda\sigma b(n-1)$ | · | · | · | $\Delta\lambda\sigma a(n-1)$ | $\Delta\lambda\sigma b(n-1)$ |
| Shot(n) | Ta(n) | Tb(n) | $\lambda t(n)$ | $\delta\lambda a(n)$ | $\delta\lambda b(n)$ | $\lambda\sigma a(n)$ | $\lambda\sigma b(n)$ | $\Delta\lambda t(n)$ | $\Delta\lambda a(n)$ | $\Delta\lambda b(n)$ | $\Delta\lambda\sigma a(n)$ | $\Delta\lambda\sigma b(n)$ |
| · | · | | | · | · | · | · | | | · | · | · |
| · | · | | | · | · | · | · | | | · | · | · |
| DETERMINATION | | | | NG | OK | NG | OK | | NG | OK | NG | OK |

Fig. 22

| SHOT NUMBER FROM START OF ADJUSTMENT OSCILLATION BEFORE AND AFTER CHANGE | ELAPSED TIME Ta FROM START TIME OF ADJUSTMENT OSCILLATION BEFORE CHANGE | ELAPSED TIME Tb FROM START TIME OF ADJUSTMENT OSCILLATION AFTER CHANGE | GAS CONTROL RELATED LASER PERFORMANCE DATA ||||
|---|---|---|---|---|---|---|
| | | | GAS PRESSURE Pa BEFORE CHANGE | GAS PRESSURE Pb AFTER CHANGE | CHARGE VOLTAGE Va BEFORE CHANGE | CHARGE VOLTAGE Vb AFTER CHANGE |
| Shot(1) | Ta(1) | Tb(1) | Pa(1) | Pb(1) | Va(1) | Vb(1) |
| Shot(2) | Ta(2) | Tb(2) | Pa(2) | Pb(2) | Va(2) | Vb(2) |
| Shot(3) | Ta(3) | Tb(3) | Pa(3) | Pb(3) | Va(3) | Vb(3) |
| Shot(4) | Ta(4) | Tb(4) | Pa(4) | Pb(4) | Va(4) | Vb(4) |
| Shot(5) | Ta(5) | Tb(5) | Pa(5) | Pb(5) | Va(5) | Vb(5) |
| Shot(6) | Ta(6) | Tb(6) | Pa(6) | Pb(6) | Va(6) | Vb(6) |
| Shot(7) | Ta(7) | Tb(7) | Pa(7) | Pb(7) | Va(7) | Vb(7) |
| Shot(8) | Ta(8) | Tb(8) | Pa(8) | Pb(8) | Va(8) | Vb(8) |
| . | . | | . | . | . | . |
| . | . | | . | . | . | . |
| . | . | | . | . | . | . |
| Shot(n) | Ta(n) | Tb(n) | Pa(n) | Pb(n) | Va(n) | Vb(n) |
| . | . | | . | . | . | . |
| . | . | | . | . | . | . |
| DETERMINATION | | | NG | OK | | |

LASER APPARATUS, LASER APPARATUS MANAGEMENT SYSTEM, AND LASER APPARATUS MANAGEMENT METHOD

CROSS-REFERENCE TO RELATED APPLICATIONS

The present application is a continuation application of International Application No. PCT/JP2017/021620 filed on Jun. 12, 2017. The content of the application is incorporated herein by reference in its entirety.

BACKGROUND

1. Technical Field

The present disclosure relates to a laser apparatus, a laser apparatus management system, and a laser apparatus management method.

2. Related Art

Recently, in a semiconductor exposure apparatus (hereinafter referred to as "exposure apparatus"), resolving power improvement has been requested along with miniaturization and high integration of a semiconductor integrated circuit. Thus, the wavelength of light discharged from an exposure light source has been shortened. Typically, a gas laser apparatus is used as the exposure light source in place of a conventional mercury lamp. Examples of the gas laser apparatus for exposure include a KrF excimer laser apparatus configured to output an ultraviolet laser beam having a wavelength of 248 nm, and an ArF excimer laser apparatus configured to output an ultraviolet laser beam having a wavelength of 193 nm.

Immersion exposure in which a space between an exposure lens on the exposure apparatus side and a wafer is filled with liquid has been practically used as a next generation exposure technology. In the immersion exposure, the apparent wavelength of the exposure light source is shortened due to change of the refractive index of the space between the exposure lens and the wafer. When the immersion exposure is performed by using the ArF excimer laser apparatus as the exposure light source, the wafer is irradiated with ultraviolet light having a wavelength of 134 nm in the water. This technology is called ArF immersion exposure (or ArF immersion lithography).

The KrF excimer laser apparatus and the ArF excimer laser apparatus each have a wide spontaneous oscillation width of 350 µm to 400 µm approximately. Thus, chromatic aberration occurs in some cases when a projection lens is made of a material that transmits ultraviolet such as KrF and ArF laser beams. This can lead to resolving power decrease. Thus, the spectrum line width of a laser beam output from the gas laser apparatus needs to be narrowed so that chromatic aberration becomes negligible. To narrow the spectrum line width, a line narrow module (LNM) including a line narrow element (for example, etalon or grating) is provided in a laser resonator of the gas laser apparatus in some cases. In the following, a laser apparatus that achieves narrowing of the spectrum line width is referred to as a line narrow laser apparatus.

LIST OF DOCUMENTS

Patent Documents

Patent Document 1: Japanese Unexamined Patent Application Publication No. 2002-43219
Patent Document 2: Japanese Unexamined Patent Application Publication No. 2000-306813
Patent Document 3: Japanese Unexamined Patent Application Publication No. 7-142801
Patent Document 4: National Publication of International Patent Application No. 2003-514403
Patent Document 5: Japanese Unexamined Patent Application Publication No. 2002-15986

SUMMARY

A laser apparatus of the present disclosure includes: a laser output unit configured to perform laser oscillation; and a control unit configured to acquire first laser performance data obtained when the laser output unit performs laser oscillation based on a first laser control parameter, and second laser performance data obtained when the laser output unit performs laser oscillation based on a second laser control parameter, while laser output from the laser output unit to an external device is stopped, and determine whether the second laser performance data has been improved as compared to the first laser performance data.

A laser apparatus management system of the present disclosure includes: a laser apparatus, and a terminal device configured to manage the laser apparatus. The laser apparatus includes: a laser output unit configured to perform laser oscillation; and a control unit configured to acquire first laser performance data obtained when the laser output unit performs laser oscillation based on a first laser control parameter, and second laser performance data obtained when the laser output unit performs laser oscillation based on a second laser control parameter, while laser output from the laser output unit to an external device is stopped, and determine whether the second laser performance data has been improved as compared to the first laser performance data.

A laser apparatus management method of the present disclosure includes: acquiring, by a control unit, first laser performance data obtained when a laser output unit performs laser oscillation based on a first laser control parameter, and second laser performance data obtained when the laser output unit performs laser oscillation based on a second laser control parameter, while laser output from the laser output unit to an external device is stopped at a laser apparatus; and determining, by the control unit, whether the second laser performance data has been improved as compared to the first laser performance data.

BRIEF DESCRIPTION OF THE DRAWINGS

Embodiments of the present disclosure will be described below as examples with reference to the accompanying drawings.

FIG. 3 schematically illustrates various types of exemplary control parameters at the laser apparatus according to the comparative example.

FIG. 19 schematically illustrates exemplary data of various types of control parameters before and after control parameter change, which is stored in a server in the laser apparatus management system according to Embodiment 2.

FIG. 20 schematically illustrates exemplary energy control related laser performance data before and after control parameter change, which is stored in the server in the laser apparatus management system according to Embodiment 2.

FIG. 21 schematically illustrates exemplary spectrum control related laser performance data before and after control parameter change, which is stored in the server in the laser apparatus management system according to Embodiment 2.

FIG. 22 schematically illustrates exemplary gas control related laser performance data before and after control parameter change in the laser apparatus and the laser apparatus management system according to Embodiment 2.

DESCRIPTION OF EMBODIMENTS

<Contents>
<1. Comparative example> (FIGS. 1 to 9)
  1.1 Configuration
  1.2 Operation
  1.3 Problem
<2. Embodiment 1> (laser apparatus and laser apparatus management system having function to change control parameter reservation) (FIGS. 10 to 17)
  2.1 Configuration
  2.2 Operation
  2.3 Effect
<3. Embodiment 2> (laser apparatus and laser apparatus management system having function to change control parameter reservation through server) (FIGS. 18 to 22)
  3.1 Configuration
  3.2 Operation
  3.3 Effect
<4. Other>

Embodiments of the present disclosure will be described below in detail with reference to the accompanying drawings.

The embodiments described below are examples of the present disclosure, and do not limit the contents of the present disclosure. Not all configurations and operations described in each embodiment are necessarily essential as configurations and operations of the present disclosure.

Components identical to each other are denoted by an identical reference sign, and duplicate description thereof will be omitted.

1. Comparative Example

[1.1 Configuration]

Figure 1:
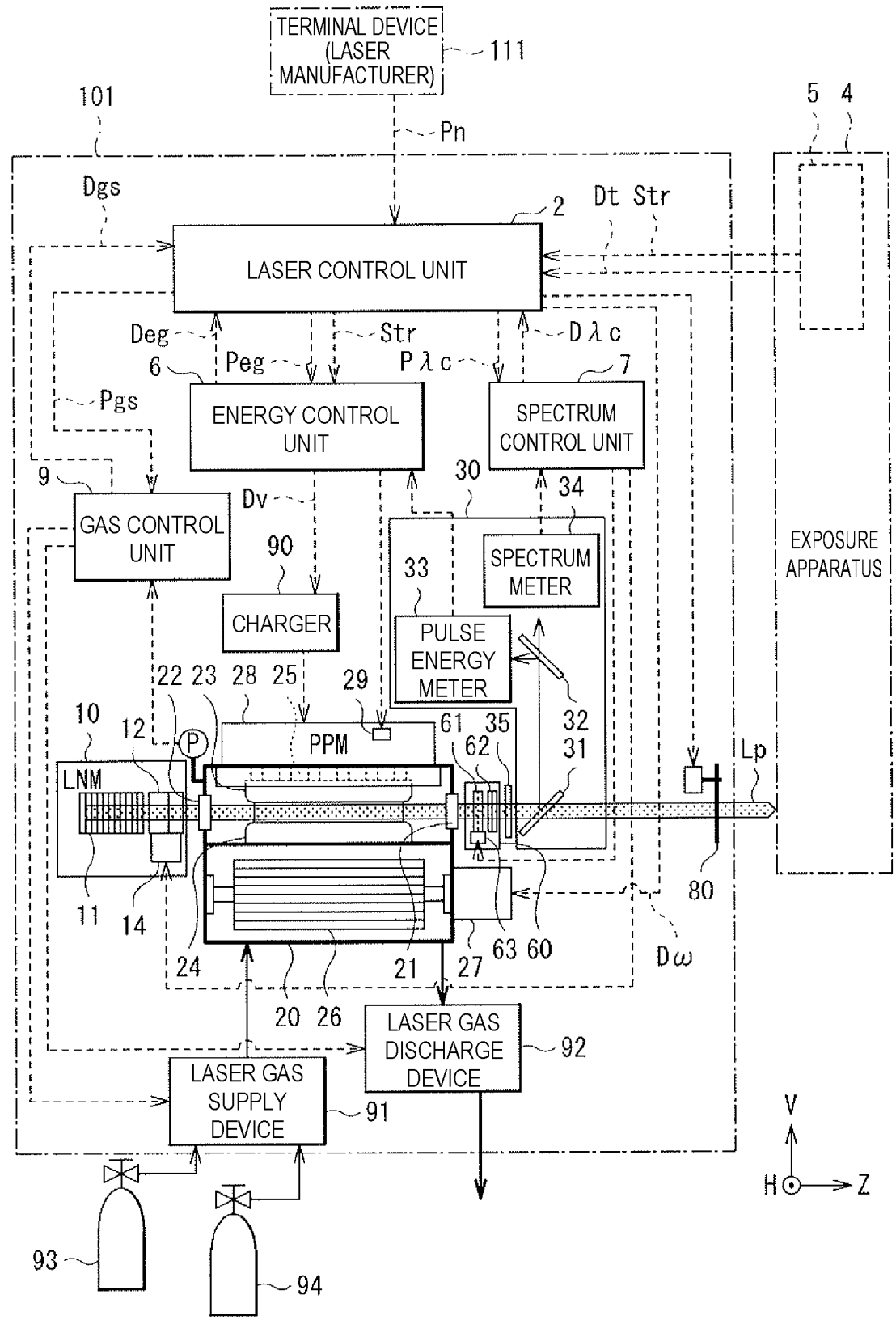
FIG. 1 schematically illustrates an exemplary configuration of a laser apparatus and a laser apparatus management system according to a comparative example.

FIG. 1 schematically illustrates an exemplary configuration of a laser apparatus and a laser apparatus management system according to a comparative example.

In the present specification, the direction of the optical path axis of a laser beam may be a Z direction. Two directions substantially orthogonal to the Z direction may be a H direction and a V direction. The H direction may be substantially orthogonal to the sheet of FIG. 1.

The laser apparatus management system according to the comparative example may include a laser apparatus 101 and a terminal device 111. The terminal device 111 may be a terminal such as a personal computer (PC) operated by the laser manufacturer of the laser apparatus 101.

The laser apparatus 101 may include a laser output unit configured to perform laser oscillation and output a pulse laser beam Lp toward an exposure apparatus 4 as an external device. The laser output unit may include a laser chamber 20 to which laser gas is supplied, a line narrowing module (LNM) 10, and an output coupling mirror 35 as an outcoupler (OC).

The laser apparatus 101 includes an emission port shutter 80 disposed on an optical path between the laser output unit and the exposure apparatus 4. The emission port shutter 80 is opened when laser output from the laser output unit to the exposure apparatus 4 is performed. The emission port shutter 80 is closed, for example, when laser oscillation is performed but laser output from the laser output unit to the exposure apparatus 4 is stopped. The emission port shutter 80 is closed, for example, when adjustment oscillation is performed.

The exposure apparatus 4 may perform wafer exposure. The wafer exposure may include scanning exposure. The "scanning exposure" is a method of exposing an exposure region of a wafer while scanning with the pulse laser beam Lp.

The laser apparatus 101 may perform burst operation in accordance with the wafer exposure at the exposure apparatus 4. The "burst operation" is operation of alternately repeating a burst duration in which continuous oscillation of the pulse laser beam Lp, the spectral width of which is narrowed in accordance with the scanning exposure, is performed, and an oscillation stop duration in which the oscillation is stopped.

Before description of the configuration of the laser apparatus management system, the following describes overview of the burst operation and the wafer exposure. The laser apparatus 101 may first perform adjustment oscillation, and then, after a predetermined duration, perform the burst operation for exposure of the first wafer. The adjustment oscillation is oscillation to output the pulse laser beam Lp for adjustment without irradiating a wafer with the pulse laser beam Lp. The pulse laser beam Lp may be output at a predetermined frequency of, for example, several hundred Hz to several kHz approximately. In the wafer exposure, the burst operation of repeating the burst duration and the oscillation stop duration is typically performed. The burst operation may be performed in the adjustment oscillation as well. The exposure apparatus 4 may perform exposure of the first wafer a relatively long interval time after the adjustment oscillation. The wafer exposure may be performed by dividing the wafer into a plurality of predetermined exposure regions and scanning exposure of each exposure region. Specifically, in the wafer exposure, the first predetermined exposure region of the wafer may be exposed in the first scanning exposure, then the second predetermined exposure region may be exposed in the second scanning exposure, and such steps may be repeated. During single scanning exposure, a plurality of pulse laser beams Lp may be continuously output from the laser apparatus 101. The scanning exposure of the second predetermined exposure region may be performed a predetermined interval after the scanning exposure of the first predetermined exposure region is ended. Such scanning exposure may be sequentially repeated, and when scanning exposure is completed for all exposure regions of the first wafer, the adjustment oscillation may be performed again, and then the wafer exposure of the second wafer may be performed.

The following describes the configuration of the laser apparatus management system again with reference to FIG. 1.

The laser apparatus 101 may further include a laser control unit 2, an energy control unit 6, a spectrum control unit 7, and a gas control unit 9. The laser apparatus 101 may further include a monitor module (MM) 30, a spectrum variation unit 60, a charger 90, a laser gas supply device 91, and a laser gas discharge device 92.

A signal line through which control parameter change data Pn as change data of various types of control parameters in the laser apparatus 101 and a control parameter transmission request signal for requesting transmission of the control parameter change data Pn from the terminal device 111 to the laser control unit 2 are transmitted from the terminal device 111 to the laser control unit 2 may be provided between the terminal device 111 and the laser control unit 2.

A signal line through which various types of target data Dt is transmitted from the exposure apparatus control unit 5 to the laser control unit 2 may be provided between an exposure apparatus control unit 5 and the laser control unit 2. The various types of target data Dt may include a target pulse energy Et, a target wavelength $\lambda t$, and a target spectrum line width $\Delta\lambda t$.

The laser chamber 20 may include windows 21 and 22, a pair of discharge electrodes 23 and 24, an electric insulation member 25, a cross flow fan (CFF) 26, a motor 27, and a pulse power module (PPM) 28.

The electric insulation member 25 may be, for example, alumina ceramic. The pulse power module 28 may include a switch 29 and may be connected with the discharge electrode 23 through a feedthrough (not illustrated) of the electric insulation member 25. The discharge electrode 24 may be connected with the laser chamber 20 being grounded.

The line narrowing module 10 and the output coupling mirror 35 may form an optical resonator. The laser chamber 20 may be disposed so that an electrical discharging region between the pair of discharge electrodes 23 and 24 is disposed on the optical path of the resonator. The output coupling mirror 35 may be coated with a multi-layered film that reflects a part of a laser beam generated in the laser chamber 20 and transmits another part thereof.

The line narrowing module 10 may include a grating 11, a prism 12, and a rotation stage 14 configured to rotate the prism 12.

The prism 12 may be disposed so that a laser beam output from the laser chamber 20 is subjected to beam expansion at the prism 12 and incident on the grating 11 at a predetermined angle.

The rotation stage 14 may be disposed so that the incident angle of a beam on the grating 11 is changed when the prism 12 is rotated. The grating 11 may be disposed in the Littrow configuration so that the incident angle and the diffracting angle of a beam are equal to each other.

The charger 90 and the pulse power module 28 may be electrically connected with each other to charge a charging capacitor (not illustrated) of the pulse power module 28, which has capacitance C0. The charger 90 may receive charge voltage data Dv indicating a charge voltage V from the energy control unit 6.

The laser control unit 2 may receive a light emission trigger signal Str input from the exposure apparatus control unit 5 of the exposure apparatus 4. The energy control unit 6 may receive the light emission trigger signal Str input through the laser control unit 2. The energy control unit 6 and the pulse power module 28 may be electrically connected with each other so that the switch 29 is turned on and off in synchronization with the light emission trigger signal Str.

The monitor module 30 may include beam splitters 31 and 32, a pulse energy meter 33, and a spectrum meter 34.

The beam splitter 31 may be disposed on the optical path of the pulse laser beam Lp output from the output coupling mirror 35. The beam splitter 32 may be disposed on the optical path of the pulse laser beam Lp reflected by the beam splitter 31. The beam splitter 32 may be disposed so that reflected light is incident on the pulse energy meter 33 and transmitted light is incident on the spectrum meter 34.

The pulse energy meter 33 may include a light condensation lens and an optical sensor (not illustrated). The optical sensor may be a fast photodiode having resistance to ultraviolet light.

The spectrum meter 34 may be a spectrometer including an etalon (not illustrated). The spectrum meter 34 may be, for example, a monitor etalon spectrometer including a monitor etalon (not illustrated), a light condensation lens, and an image sensor configured to measure interference fringes transmitting through the monitor etalon and generated on a focal point surface through the light condensation lens.

A signal line through which a stage angle control signal for controlling the rotation stage angle θ of the rotation stage 14 is transmitted from the spectrum control unit 7 to the rotation stage 14 may be provided between the spectrum control unit 7 and the rotation stage 14 of the line narrowing module 10. The rotation stage angle θ of the rotation stage 14 may be controlled based on a wavelength λ detected by the spectrum meter 34.

A signal line through which spectrum control related data Dλc based on a result of measurement by the spectrum meter 34 is transmitted from the spectrum control unit 7 to the laser control unit 2 may be provided between the spectrum control unit 7 and the laser control unit 2.

The spectrum variation unit 60 may be disposed on the optical path between the laser chamber 20 and the output coupling mirror 35. The spectrum variation unit 60 may include a cylindrical concave lens 61, a cylindrical convex lens 62, and a linear stage 63. In the spectrum variation unit 60, one surface of the cylindrical convex lens 62 at a position farthest from the laser chamber 20 is a plane, and this plane may be coated with a partial reflection film.

The cylindrical concave lens 61 and the cylindrical convex lens 62 may be disposed on the optical path between the laser chamber 20 and the output coupling mirror 35. The lens interval between the cylindrical concave lens 61 and the cylindrical convex lens 62 may be changeable through the linear stage 63.

A signal line through which a stage position control signal for controlling a stage position X of the linear stage 63 is transmitted from the spectrum control unit 7 to the linear stage 63 may be provided between the spectrum control unit 7 and the linear stage 63.

A signal line through which data of the target wavelength λt and the target spectrum line width Δλt for performing spectrum control is transmitted from the laser control unit 2 to the spectrum control unit 7 may be provided between the laser control unit 2 and the spectrum control unit 7. A signal line through which a spectrum control parameter Pλc for performing spectrum control is transmitted from the laser control unit 2 to the spectrum control unit 7 may be provided between the laser control unit 2 and the spectrum control unit 7.

A signal line through which the charge voltage data Dv indicating the charge voltage V is transmitted from the energy control unit 6 to the charger 90 may be provided between the energy control unit 6 and the charger 90. The charge voltage V may be controlled based on a pulse energy E measured by the pulse energy meter 33. The charge voltage V may be voltage for charging the charging capacitor (not illustrated) of the pulse power module 28.

A signal line through which energy control related data Deg based on a result of measurement by the pulse energy meter 33 is transmitted from the energy control unit 6 to the laser control unit 2 may be provided between the energy control unit 6 and the laser control unit 2.

A signal line through which a gas control related data Dgs is transmitted from the gas control unit 9 to the laser control unit 2 may be provided between the gas control unit 9 and the laser control unit 2.

The laser gas supply device 91 may be configured to supply the buffer gas and the fluorine-containing gas as laser gas into the laser chamber 20 based on a control signal from the gas control unit 9. The buffer gas may be "Ar+Ne" mixed gas. The fluorine-containing gas may be "Ar+Ne+$F_2$" mixed gas. The laser gas supply device 91 may be connected with a gas tank 93 from which "Ar+Ne" mixed gas as the buffer gas is supplied, and a gas tank 94 from which "Ar+Ne+$F_2$" mixed gas as the fluorine-containing gas is supplied. The laser gas supply device 91 may include a valve for controlling supply of the "Ar+Ne" mixed gas from the gas tank 93, and a valve for controlling supply of the "Ar+Ne+$F_2$" mixed gas from the gas tank 94.

The laser gas discharge device 92 may be configured to discharge laser gas in the laser chamber 20 in accordance with a control signal from the gas control unit 9. The laser gas discharge device 92 may include a valve for controlling discharge, a discharge pump, and a halogen filter that traps $F_2$ gas in discharge gas.

A signal line through which a gas control parameter Pgs for performing gas control is transmitted from the laser control unit 2 to the gas control unit 9 may be provided between the laser control unit 2 and the gas control unit 9.

A signal line through which data of the target pulse energy Et for performing energy control is transmitted from the laser control unit 2 to the energy control unit 6 may be provided between the laser control unit 2 and the energy control unit 6. A signal line through which the light emission trigger signal Str is transmitted from the laser control unit 2 to the energy control unit 6 may be provided between the laser control unit 2 and the energy control unit 6. A signal line through which an energy control parameter Peg for performing energy control is transmitted from the laser control unit 2 to the energy control unit 6 may be provided between the laser control unit 2 and the energy control unit 6.

A signal line through which data of the target wavelength λt for performing spectrum control is transmitted from the laser control unit 2 to the spectrum control unit 7 may be provided between the laser control unit 2 and the spectrum control unit 7.

A signal line through which rotation speed data Dω for controlling a rotation speed ω of the cross flow fan 26 is transmitted from the laser control unit 2 to the motor 27 of the laser chamber 20 may be provided between the laser control unit 2 and the motor 27.

The laser control unit 2 may include a storage unit (not illustrated) storing various types of control parameters.

[1.2 Operation]

(Preparation for Laser Oscillation)

The laser control unit 2 reads, from the storage unit (not illustrated), various types of control parameters as illustrated in FIG. 3 to be described later. Subsequently, the laser control unit 2 performs preparation for laser oscillation. As the preparation for laser oscillation, the laser control unit 2 transmits control parameters to the energy control unit 6, the spectrum control unit 7, and the gas control unit 9. In addition, as the preparation for laser oscillation, the laser control unit 2 transmits signals for driving various meters, stages, and the like to the control units. Subsequently, the laser control unit 2 receives a laser oscillation preparation OK signal from each control unit. Subsequently, the laser control unit 2 receives the various types of target data Dt and the light emission trigger signal Str from the exposure apparatus control unit 5.

(Control of Control Parameter Change)

Figure 2:
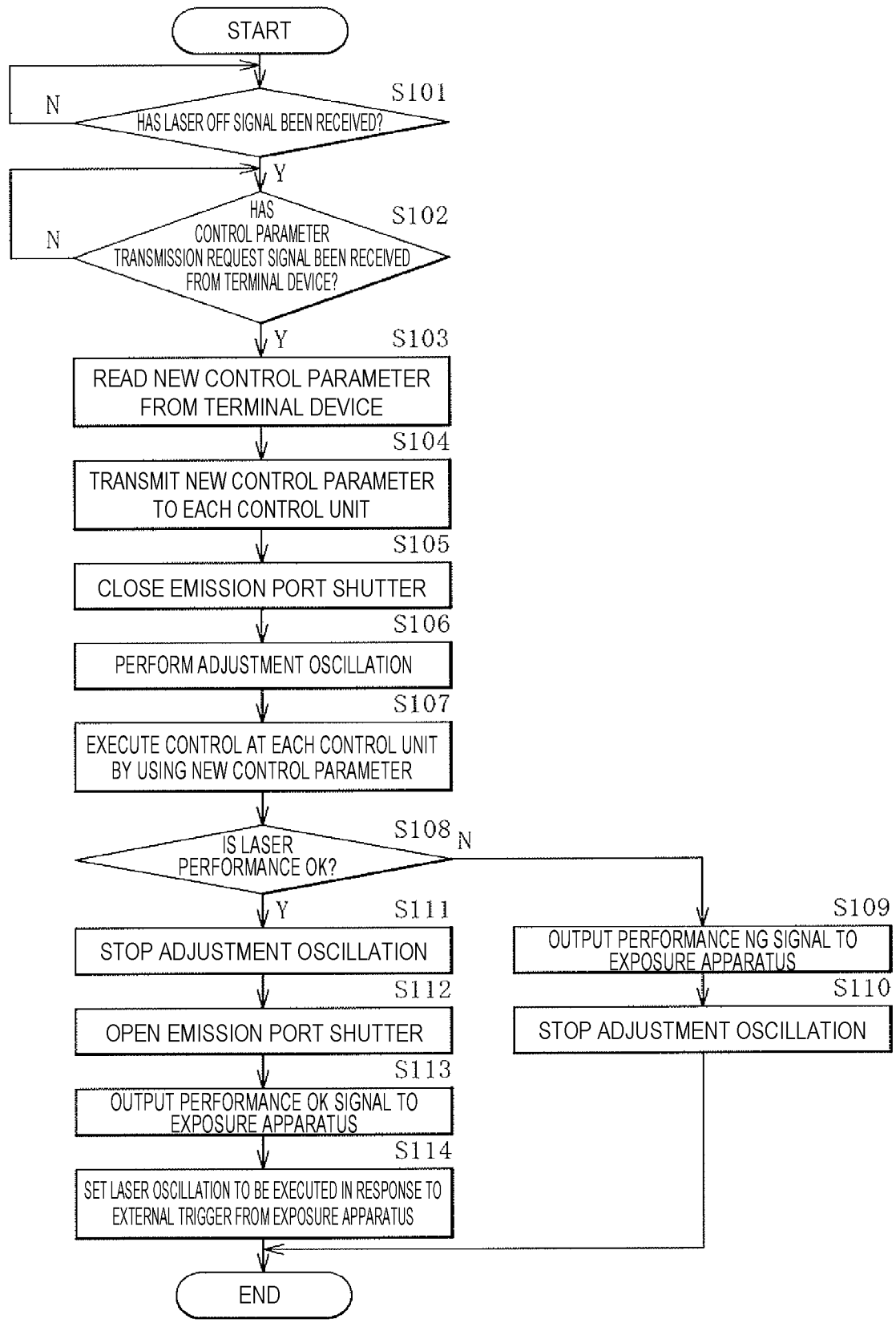
FIG. 2 is a flowchart illustrating exemplary control flow related to control parameter change at the laser apparatus according to the comparative example.

FIG. 2 is a flowchart illustrating exemplary control flow related to control parameter change at the laser apparatus 101 according to the comparative example.

The laser control unit 2 determines whether a laser OFF signal has been received (step S101). For example, the laser control unit 2 determines whether a maintenance worker has input the laser OFF signal when the exposure apparatus 4 can be stopped.

When having determined that the laser OFF signal has not been received (N at step S101), the laser control unit 2 repeats the processing at step S101. When having determined that the laser OFF signal has been received (Y at step S101), the laser control unit 2 determines whether the control parameter transmission request signal has been received from the terminal device 111 (step S102). When having determined that the control parameter transmission request signal has not been received (N at step S102), the laser control unit 2 repeats the processing at step S102.

When having determined that the control parameter transmission request signal has been received (Y at step S102), the laser control unit 2 receives the control parameter change data Pn from the terminal device 111, and reads a new control parameter to be changed (step S103). Subsequently, the laser control unit 2 transmits the new control parameter to each control unit (step S104).

Subsequently, the laser control unit 2 closes the emission port shutter 80 (step S105), and performs the adjustment oscillation (step S106). In the adjustment oscillation, laser oscillation is performed at a predetermined repetition frequency in response to an internal trigger of the laser apparatus 101, not the light emission trigger signal Str as an external trigger from the exposure apparatus control unit 5.

The control units of the energy control unit 6, the spectrum control unit 7, and the gas control unit 9 execute, for example, control as illustrated in FIGS. 4 to 9 to be described later by using the new control parameter (step S107).

Subsequently, the laser control unit 2 determines whether the laser performance is OK (step S108). The determination of whether the laser performance is OK is performed by determining whether the laser performance is in a predetermined allowable range.

When having determined that the laser performance is not OK (N at step S108), the laser control unit 2 outputs a performance NG signal to the exposure apparatus 4 (step S109). Subsequently, the laser control unit 2 stops the adjustment oscillation (step S110), and ends the processing.

When having determined that the laser performance is OK (Y at step S108), the laser control unit 2 stops the adjustment oscillation (step S111), and opens the emission port shutter 80 (step S112). Subsequently, the laser control unit 2 outputs a performance OK signal to the exposure apparatus 4 (step S113). Subsequently, the laser control unit 2 sets laser oscillation to be executed in response to an external trigger from the exposure apparatus 4 (step S114), and ends the processing.

(Specific Examples of Control Parameters)

FIG. 3 schematically illustrates various types of exemplary control parameters at the laser apparatus 101 according to the comparative example. Each control parameter is a target control parameter for controlling the laser performance of the laser apparatus 101 to become closer to target performance required by the exposure apparatus 4.

(Gas Control Parameter)

The gas control parameter Pgs may include a gas pressure control parameter and a partial gas replacement control parameter. The gas control parameter Pgs is a target control parameter for indirectly controlling the pulse energy E of the pulse laser beam Lp to become closer to the target pulse energy Et.

The gas pressure control parameter may include a minimum charge voltage Vmin, a maximum charge voltage Vmax, a maximum control gas pressure Pmax, and a gas pressure variable amount $\Delta P$. The minimum charge voltage Vmin may be the minimum value of the charge voltage V. The maximum charge voltage Vmax may be the maximum value of the charge voltage V. The maximum control gas pressure Pmax may be the maximum gas pressure in the laser chamber 20 at laser operation. The gas pressure variable amount $\Delta P$ may be a pressure change amount by which a gas pressure P is increased or decreased.

The partial gas replacement control parameter may include a partial gas replacement period Tpg, an injection coefficient Kpg of the buffer gas, and an injection coefficient Khg of the fluorine-containing gas. The partial gas replacement period Tpg may be a period in which partial gas replacement is performed. The injection coefficient Kpg of the buffer gas may be the injection amount of the "Ar+Ne" mixed gas per unit pulse. The injection coefficient Khg of the fluorine-containing gas may be the injection amount of the "Ar+Ne+$F_2$" mixed gas per unit pulse.

(Spectrum Control Parameter)

The spectrum control parameter P$\lambda$c may include a wavelength control parameter and a spectrum line width control parameter. The wavelength control parameter is a target control parameter for controlling the wavelength of the pulse laser beam Lp to become closer to the target wavelength $\lambda$t. The spectrum line width control parameter is a target control parameter for controlling the spectrum line width of the pulse laser beam Lp to become closer to the target spectrum line width $\Delta\lambda$t.

The wavelength control parameter may include a wavelength control gain $\lambda$k, and an initial angle $\theta 0$ of the rotation stage 14 in the line narrowing module 10. The initial angle $\theta 0$ of the rotation stage 14 may correspond to the initial rotation angle of the prism 12 in the line narrowing module 10. The spectrum line width control parameter may include a spectrum line width control gain $\Delta\lambda$k, and an initial position X0 of the linear stage 63 in the spectrum variation unit 60. The initial position X0 of the linear stage 63 may correspond to initial position of the cylindrical concave lens 61 in the spectrum variation unit 60.

(Energy Control Parameter)

The energy control parameter Peg is a target control parameter for controlling the pulse energy E of the pulse laser beam Lp to become closer to the target pulse energy Et.

The energy control parameter Peg may include a pulse energy control gain Vk and an initial value V0 of the charge voltage V.

(Energy Control)

The laser control unit 2 may transmit data of the target pulse energy Et and the light emission trigger signal Str to the energy control unit 6. The energy control unit 6 may transmit the charge voltage data Dv to the charger 90. The energy control unit 6 may also transmit an "on" signal to the switch 29 of the pulse power module 28 in synchronization with the light emission trigger signal Str. Accordingly, in the laser chamber 20, high voltage is applied between the pair of discharge electrodes 23 and 24, insulation breakdown occurs to laser gas in the electrical discharging region between the pair of discharge electrodes 23 and 24, and electrical discharging is generated. As a result, the laser gas is excited in the laser chamber 20, and laser oscillation occurs between the line narrowing module 10 and the output coupling mirror 35 included in the optical resonator. The pulse laser beam Lp due to the laser oscillation is output from the output coupling mirror 35.

Part of the pulse laser beam Lp output from the output coupling mirror 35 is incident on the pulse energy meter 33 through the beam splitter 31 and the beam splitter 32 as sample light for detecting the pulse energy E.

The pulse energy meter 33 detects the pulse energy E of the pulse laser beam Lp output from the output coupling mirror 35. The pulse energy meter 33 may transmit data of the detected pulse energy E to the energy control unit 6.

The energy control unit 6 may calculate the charge voltage V of the next pulse based on the difference ΔE between the pulse energy E and the target pulse energy Et, and transmit the charge voltage data Dv indicating the charge voltage V to the charger 90. As a result, the pulse energy E of the pulse laser beam Lp output from the output coupling mirror 35 becomes closer to the target pulse energy Et.

Figure 4:
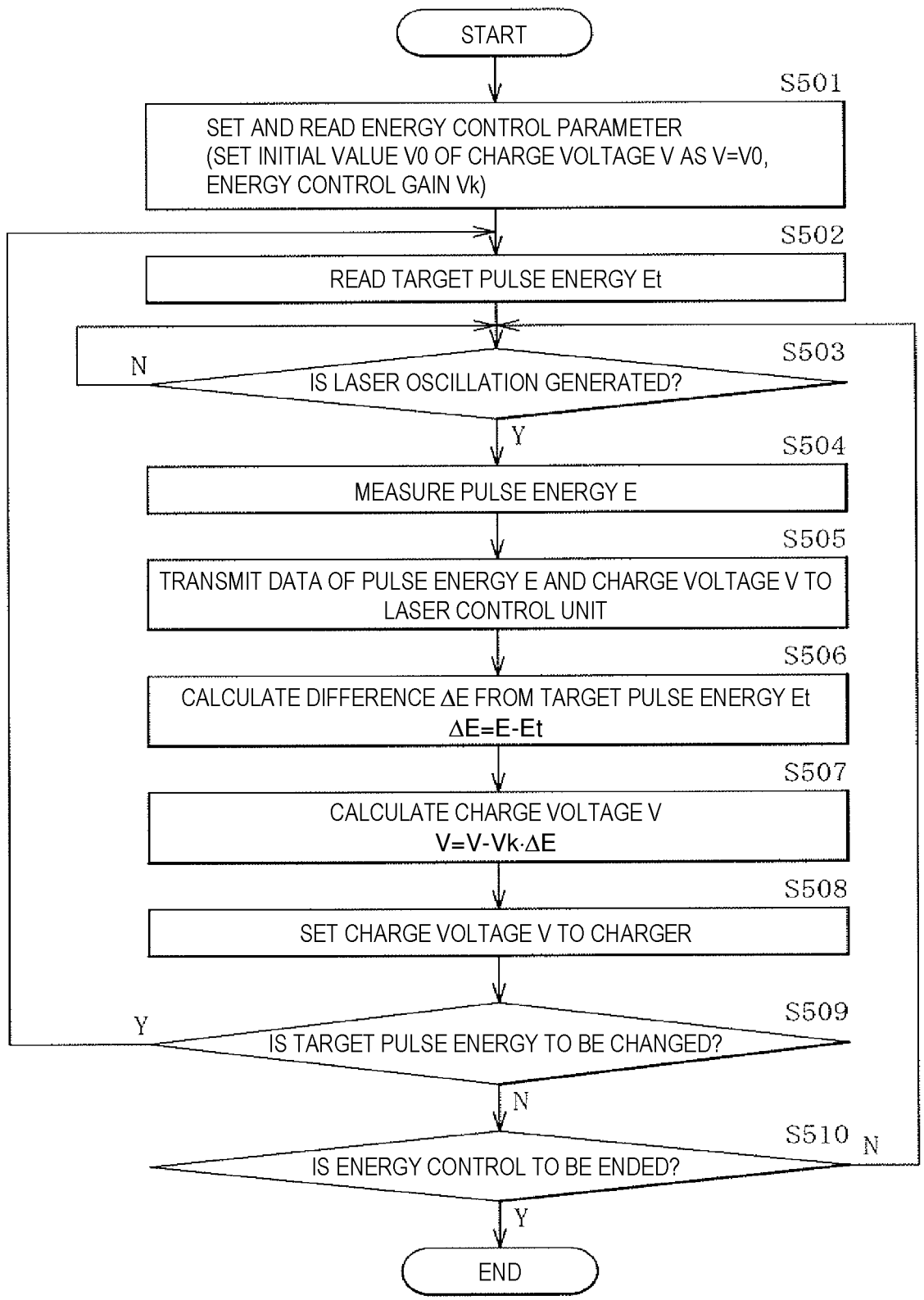
FIG. 4 is a flowchart illustrating exemplary control flow related to energy control by an energy control unit at the laser apparatus according to the comparative example.

FIG. 4 is a flowchart illustrating exemplary control flow related to the energy control by the energy control unit 6 in the laser apparatus 101.

The energy control unit 6 may set and read the energy control parameter Peg (step S501). In this process, the energy control unit 6 may set the initial value of the charge voltage V to V0. In addition, the energy control unit 6 may read the pulse energy control gain Vk through the laser control unit 2.

Subsequently, the energy control unit 6 may read the target pulse energy Et from the exposure apparatus control unit 5 through the laser control unit 2 (step S502).

Subsequently, the energy control unit 6 may determine whether laser oscillation is generated (step S503). The energy control unit 6 may determine whether laser oscillation is generated based on, for example, the light emission trigger signal Str from the exposure apparatus control unit 5. Alternatively, the energy control unit 6 may determine whether laser oscillation is generated based on, for example, the pulse energy E by detected the pulse energy meter 33.

When having determined that no laser oscillation is generated (N at step S503), the energy control unit 6 may repeat the processing at step S503.

When having determined that laser oscillation is generated (Y at step S503), the energy control unit 6 may subsequently perform measurement of the pulse energy E by the pulse energy meter 33 (step S504).

Subsequently, the energy control unit 6 may transmit data of the measured pulse energy E and the charge voltage V to the laser control unit 2 (step S505).

Subsequently, the energy control unit 6 may calculate the difference ΔE (=E−Et) between the measured pulse energy E and the target pulse energy Et (step S506).

Subsequently, the energy control unit 6 may calculate the next charge voltage V based on ΔE as represented by an expression below (step S507). Specifically, the charge voltage V for the next charging may be calculated by subtracting Vk·ΔE from the charge voltage V when the pulse energy E is measured. The pulse energy control gain Vk may be a proportional coefficient for converting ΔE into the change amount of the charge voltage V.

$$V = V - Vk \cdot \Delta E$$

where $Vk = \Delta V / \Delta E$

Subsequently, the energy control unit 6 may transmit the charge voltage data Dv indicating the calculated charge voltage V to the charger 90 and set the charge voltage V to the charger 90 (step S508).

Subsequently, the energy control unit 6 may determine whether to change the target pulse energy Et (step S509). When having determined that the target pulse energy Et is to be changed (Y at step S509), the energy control unit 6 may return to the processing at step S502.

When having determined that the target pulse energy Et is not to be changed (N at step S509), the energy control unit 6 may subsequently determine whether to end the energy control (step S510).

When having determined that the energy control is not to be ended (N at step S510), the energy control unit 6 may return to the processing at step S503. When having determined that the energy control is to be ended (Y at step S510), the energy control unit 6 may end the energy control processing.

(Spectrum Control)

The laser control unit 2 may transmit data of the target wavelength λt and the light emission trigger signal Str to the spectrum control unit 7. The spectrum control unit 7 may measure, through the spectrum meter 34 of the monitor module 30, the wavelength λ and a spectrum line width Δλ of the pulse laser beam Lp output from the output coupling mirror 35.

The spectrum control unit 7 may transmit, based on the difference δλ between the measured wavelength λ and the target wavelength λt, the stage angle control signal to the rotation stage 14 of the line narrowing module 10 so that δλ becomes closer to zero. The rotation stage angle θ of the rotation stage 14 is controlled in accordance with the stage angle control signal. As a result, the wavelength λ of the pulse laser beam Lp output from the output coupling mirror 35 becomes closer to the target wavelength λt.

The spectrum control unit 7 may transmit the spectrum control related data Dλc to the laser control unit 2. The spectrum control related data Dλc may include, for example, the target wavelength λt, the measured wavelength λ, and the spectrum line width Δλ.

Figure 5:
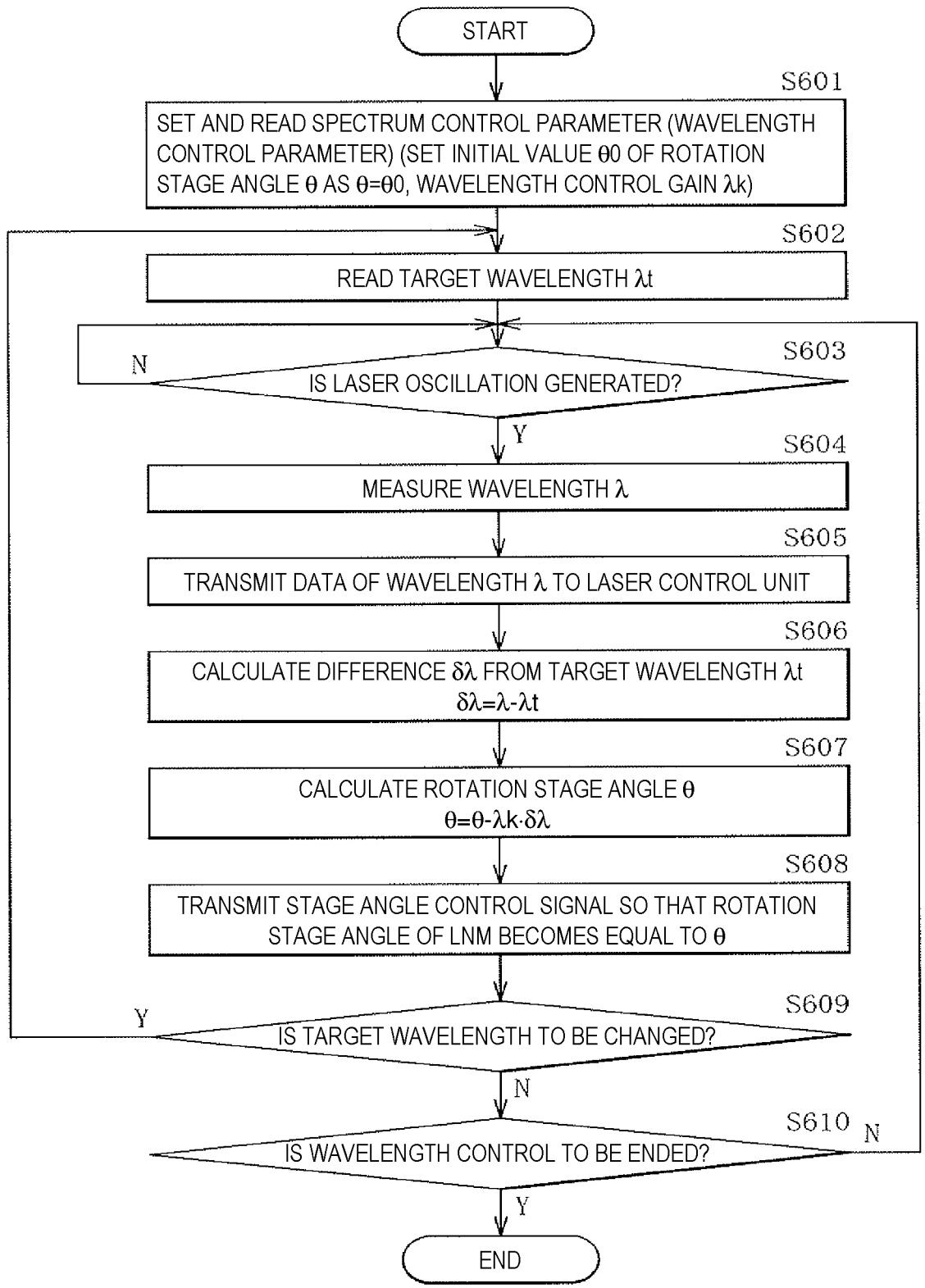
FIG. 5 is a flowchart illustrating exemplary control flow related to wavelength control by a spectrum control unit at the laser apparatus according to the comparative example.

FIG. 5 is a flowchart illustrating exemplary control flow related to wavelength control by the spectrum control unit 7 at the laser apparatus 101.

The spectrum control unit 7 may set and read the wavelength control parameter of the spectrum control parameter Pλc (step S601). The spectrum control unit 7 may set the initial value of the rotation stage angle θ of the rotation stage 14 of the line narrowing module 10 to θ0. In addition, the spectrum control unit 7 may read the wavelength control gain λk through the laser control unit 2.

Subsequently, the spectrum control unit 7 may read the target wavelength λt from the exposure apparatus control unit 5 through the laser control unit 2 (step S602).

Subsequently, the spectrum control unit 7 may determine whether laser oscillation is generated (step S603). When having determined that no laser oscillation is generated (N at step S603), the spectrum control unit 7 may repeat the processing at step S603.

When having determined that laser oscillation is generated (Y at step S603), the spectrum control unit 7 may subsequently measure the wavelength λ by using the spectrum meter 34 (step S604).

Subsequently, the spectrum control unit 7 may transmit data of the measured wavelength λ to the laser control unit 2 (step S605).

Subsequently, the spectrum control unit 7 may calculate the difference δλ (=λ−λt) between the measured wavelength λ and the target wavelength λt (step S606).

Subsequently, the spectrum control unit 7 may calculate the next rotation stage angle θ based on δλ as represented by an expression below (step S607). Specifically, the next stage angle may be calculated by subtracting λk·δλ from the rotation stage angle θ of the rotation stage 14 when the wavelength λ is measured. The wavelength control gain λk may be a proportional coefficient for converting δλ into the change amount of the rotation stage angle θ.

$$\theta = \theta - \lambda k \cdot \delta \lambda$$

where $\lambda k = \Delta \theta / \delta \lambda$

Subsequently, the spectrum control unit 7 may transmit the stage angle control signal to the rotation stage 14 of the line narrowing module 10 so that the rotation stage angle becomes equal to θ (step S608).

Subsequently, the spectrum control unit 7 may determine whether to change the target wavelength λt (step S609). When having determined that the target wavelength λt is to be changed (Y at step S609), the spectrum control unit 7 may return to the processing at step S602.

When having determined that the target wavelength λt is not to be changed (N at step S609), the spectrum control unit 7 may subsequently determine whether to end the wavelength control (step S610).

When having determined that the wavelength control is not to be ended (N at step S610), the spectrum control unit 7 may return to the processing at step S603. When having determined that the wavelength control is to be ended (Y at step S610), the spectrum control unit 7 may end the wavelength control processing.

(Spectrum Line Width Control)

The laser control unit 2 may transmit data of the target spectrum line width Δλt and the light emission trigger signal Str to the spectrum control unit 7. The spectrum control unit 7 may measure the spectrum line width Δλ of the pulse laser beam Lp output from the output coupling mirror 35 by using the spectrum meter 34 of the monitor module 30.

The spectrum control unit 7 may transmit, based on the difference ΔΔλ between the measured spectrum line width Δλ and the target spectrum line width Δλt, the stage position control signal to the linear stage 63 of the spectrum variation unit 60 so that ΔΔλ becomes closer to zero. The stage position X of the linear stage 63 is controlled in accordance with the stage position control signal. As a result, the spectrum line width Δλ of the pulse laser beam Lp output from the output coupling mirror 35 becomes closer to the target spectrum line width Δλt.

The spectrum control unit 7 may transmit, to the laser control unit 2, the spectrum control related data Ac including the target spectrum line width Δλt and the measured spectrum line width Δλ.

Figure 6:
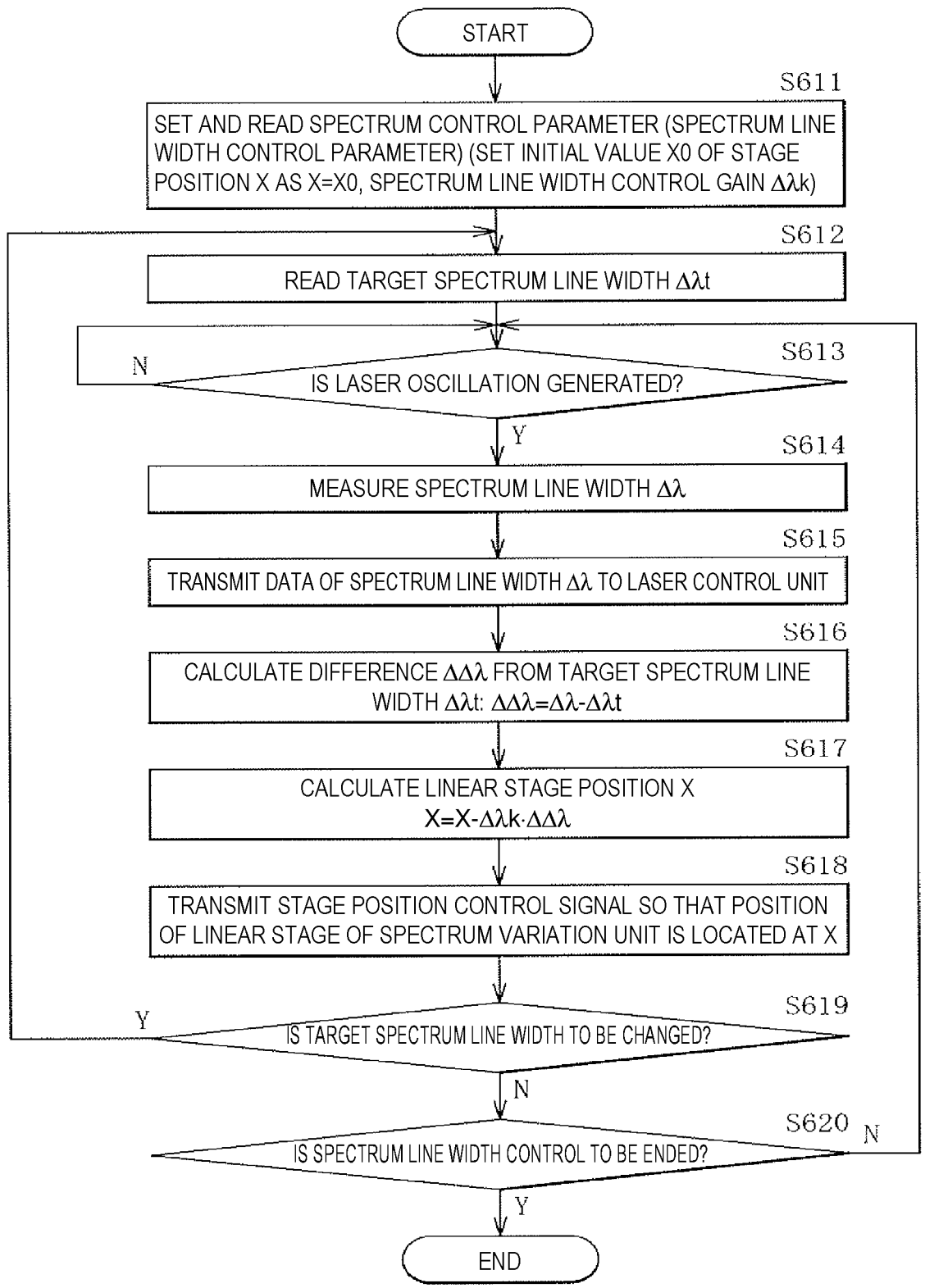
FIG. 6 is a flowchart illustrating exemplary control flow related to spectrum line width control by the spectrum control unit at the laser apparatus according to the comparative example.

FIG. 6 is a flowchart illustrating exemplary control flow related to spectrum line width control by the spectrum control unit 7 at the laser apparatus 101.

The spectrum control unit 7 may set and read the spectrum line width control parameter of the spectrum control parameter Pλc (step S611). The spectrum control unit 7 may set the initial value of the position X of the linear stage 63 of the spectrum variation unit 60 to X0. In addition, the spectrum control unit 7 may read the spectrum line width control gain Δλk through the laser control unit 2.

Subsequently, the spectrum control unit 7 may read the target spectrum line width Δλt from the exposure apparatus control unit 5 through the laser control unit 2 (step S612).

Subsequently, the spectrum control unit 7 may determine whether laser oscillation is generated (step S613). When having determined that no laser oscillation is generated (N at step S613), the spectrum control unit 7 may repeat the processing at step S613.

When having determined that laser oscillation is generated (Y at step S613), the spectrum control unit 7 may subsequently measure the spectrum line width Δλ through the spectrum meter 34 (step S614).

Subsequently, the spectrum control unit 7 may transmit data of the measured spectrum line width Δλ to the laser control unit 2 (step S615).

Subsequently, the spectrum control unit 7 may calculate the difference ΔΔλ (=Δλ−Δλt) between the measured spectrum line width Δλ and the target spectrum line width Δλt (step S616).

Subsequently, the spectrum control unit 7 may calculate the next position X of the linear stage 63 based on ΔΔλ as represented by an expression below (step S617). Specifically, the next position X of the linear stage 63 may be calculated by subtracting Δλk·ΔΔλ from the position X of the linear stage 63 when the spectrum line width is measured. The spectrum line width control gain Δλk may be a proportional coefficient for converting ΔΔλ into the change amount of the position X.

$$X = X - \Delta\lambda k \cdot \Delta\Delta\lambda$$

where $\Delta\lambda k = \Delta X / \Delta\Delta\lambda$

Subsequently, the spectrum control unit 7 may transmit the stage position control signal to the linear stage 63 of the spectrum variation unit 60 so that the position of the linear stage 63 is located at X (step S618).

Subsequently, the spectrum control unit 7 may determine whether to change the target spectrum line width Δλt (step S619). When having determined that the target spectrum line width Δλt is to be changed (Y at step S619), the spectrum control unit 7 may return to the processing at step S612.

When having determined that the target spectrum line width Δλt is not to be changed (N at step S619), the spectrum control unit 7 may subsequently determine whether to end the spectrum line width control (step S620).

When having determined that the spectrum line width control is not to be ended (N at step S620), the spectrum control unit 7 may return to the processing at step S613. When having determined that the spectrum line width control is to be ended (Y at step S620), the spectrum control unit 7 may end the spectrum line width control processing.

(Gas Control)

The gas control unit 9 may perform, as gas control, gas pressure control and partial gas replacement control. The laser control unit 2 may transmit the gas control parameter Pgs to the gas control unit 9. The gas control parameter Pgs may include the gas pressure control parameter and the partial gas replacement control parameter.

(Gas Pressure Control)

The gas pressure control by the gas control unit 9 may employ a gas control scheme utilizing characteristics described below. When the laser gas pressure becomes higher, the insulation breakdown voltage increases, and the pulse energy E of the pulse laser beam Lp output from the output coupling mirror 35 increases. When the laser gas pressure becomes lower, the insulation breakdown voltage decreases, and the pulse energy E of the pulse laser beam Lp output from the output coupling mirror 35 decreases.

The gas control unit 9 may measure the gas pressure P in the laser chamber 20 through a pressure sensor. The gas control unit 9 may transmit data of the gas pressure P to the laser control unit 2.

When the charge voltage V has become equal to or higher than the maximum charge voltage Vmax, the gas control unit 9 may control the laser gas supply device 91 to inject the "Ar+Ne" mixed gas into the laser chamber 20 so that the gas pressure P increases by the gas pressure variable amount ΔP. When the charge voltage V has become equal to or lower than the minimum charge voltage Vmin, the gas control unit 9 may control the laser gas discharge device 92 to discharge gas in the laser chamber 20 so that the gas pressure P decreases by the gas pressure variable amount ΔP.

Figure 7:
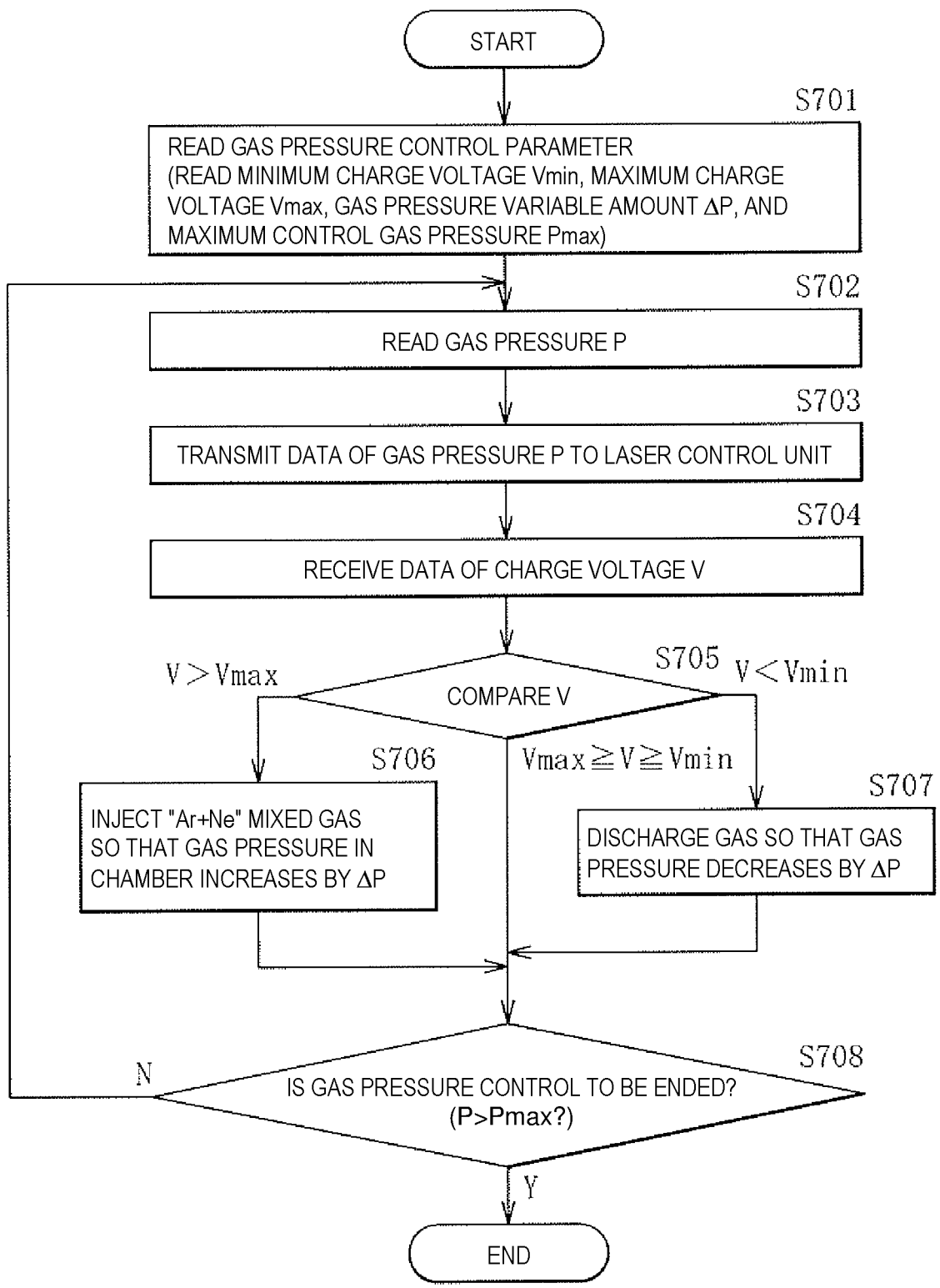
FIG. 7 is a flowchart illustrating exemplary control flow related to gas pressure control by a gas control unit at the laser apparatus according to the comparative example.

FIG. 7 is a flowchart illustrating exemplary control flow related to the gas pressure control by the gas control unit 9 in the laser apparatus 101.

The gas control unit 9 may read the gas pressure control parameter of the gas control parameter Pgs (step S701). The gas control unit 9 may read, as the gas pressure control parameter, the minimum charge voltage Vmin, the maximum charge voltage Vmax, the maximum control gas pressure Pmax, and the gas pressure variable amount ΔP through the laser control unit 2.

Subsequently, the gas control unit 9 may read the gas pressure P in the laser chamber 20, which is measured by the pressure sensor (step S702).

Subsequently, the gas control unit 9 may transmit data of the measured gas pressure P to the laser control unit 2 (step S703).

Subsequently, the gas control unit 9 may receive data of the charge voltage V through the laser control unit 2 (step S704).

Subsequently, the gas control unit 9 may compare the value of the charge voltage V with the minimum charge voltage Vmin and the maximum charge voltage Vmax (step S705). When Vmax≥V≥Vmin holds, the gas control unit 9 may determine whether to end the gas pressure control (step S708). The determination of whether to end the gas pressure control may be performed by, for example, determining whether the measured gas pressure P exceeds the maximum control gas pressure Pmax.

When V>Vmax holds, the gas control unit 9 may control the laser gas supply device 91 to inject the "Ar+Ne" mixed gas into the laser chamber 20 so that the gas pressure P in the laser chamber 20 increases by the gas pressure variable amount ΔP (step S706). Thereafter, the gas control unit 9 may determine whether to end the gas pressure control (step S708).

When V<Vmin holds, the gas control unit 9 may control the laser gas discharge device 92 to discharge gas in the laser chamber 20 so that the gas pressure P in the laser chamber 20 decreases by the gas pressure variable amount ΔP (step S707). Thereafter, the gas control unit 9 may determine whether to end the gas pressure control (step S708).

When having determined that the gas pressure control is not to be ended (N at step S708), the gas control unit 9 may return to the processing at step S702. When having determined that the gas pressure control is to be ended (Y at step S708), the gas control unit 9 may end the gas pressure control processing.

(Partial Gas Replacement Control)

The partial gas replacement control by the gas control unit 9 may be control to inject predetermined amounts of the "Ar+Ne" mixed gas and the "Ar+Ne+$F_2$" mixed gas into the laser chamber 20 in, for example, a constant period, and then to discharge gas in the laser chamber 20 by the amounts of the injected gasses. Through the partial gas replacement control, the laser chamber 20 is replenished with gas in an amount corresponding to decrease of $F_2$ gas through electrical discharging. Through the partial gas replacement control, the concentration of impurity gas generated in the laser chamber 20 and the concentration of $F_2$ gas can be each maintained at a predetermined concentration.

Figure 8:
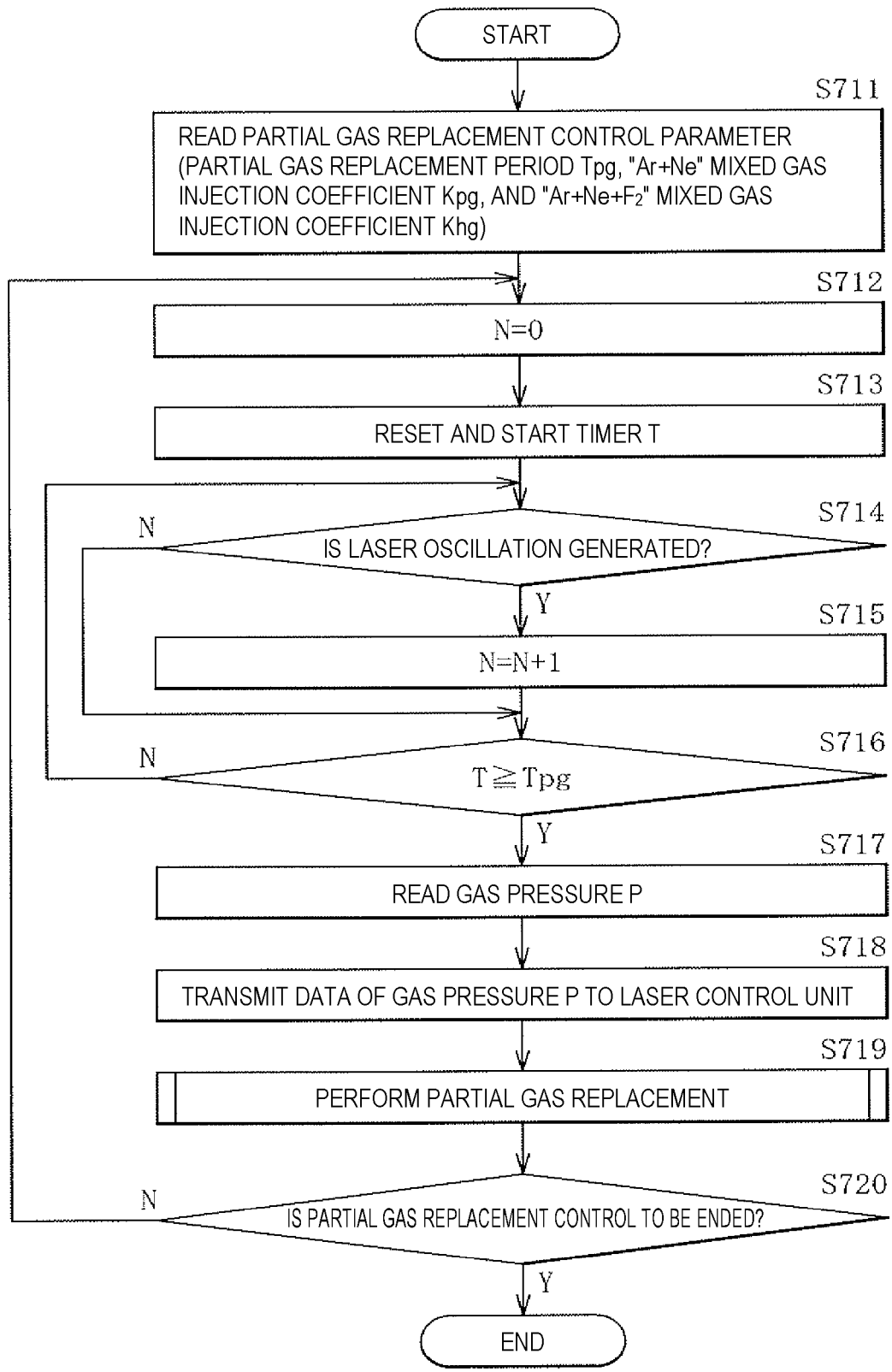
FIG. 8 is a flowchart illustrating exemplary control flow related to partial gas replacement control by the gas control unit at the laser apparatus according to the comparative example.

FIG. 8 is a flowchart illustrating exemplary control flow related to the partial gas replacement control by the gas control unit 9 in the laser apparatus 101.

The gas control unit 9 may read the partial gas replacement control parameter of the gas control parameter Pgs (step S711). The gas control unit 9 may read, as the partial gas replacement control parameter, the partial gas replacement period Tpg, the injection coefficient Kpg of the "Ar+Ne" mixed gas, and the injection coefficient Khg of the "Ar+Ne+$F_2$" mixed gas. The injection coefficient Kpg may be the injection amount of the "Ar+Ne" mixed gas per unit oscillation pulse. The injection coefficient Khg may be the injection amount of the "Ar+Ne+$F_2$" mixed gas per unit oscillation pulse.

Subsequently, the gas control unit 9 may set the initial value of the counter value N of the number of pulses to zero (step S712). Subsequently, the gas control unit 9 may reset and start a timer T (step S713).

Subsequently, the gas control unit 9 may determine whether laser oscillation is generated (step S714). When having determined that no laser oscillation is generated (N at step S714), the gas control unit 9 may proceed to processing at step S716.

When having determined that laser oscillation is generated (Y at step S714), the gas control unit 9 may subsequently set the counter value N of the number of pulses to N+1 (step S715).

Subsequently, the gas control unit 9 may determine whether the value of the timer T has reached the partial gas replacement period Tpg (step S716). Accordingly, the gas control unit 9 may measure the number of pulses of laser oscillation in the partial gas replacement period Tpg. When having determined that the value of the timer T has not reached the partial gas replacement period Tpg (N at step S716), the gas control unit 9 may return to the processing at step S714.

When having determined that the value of the timer T has reached the partial gas replacement period Tpg (Y at step S716), the gas control unit 9 may subsequently read the gas pressure P in the laser chamber 20, which is measured by the pressure sensor (step S717).

Subsequently, the gas control unit 9 may transmit data of the measured gas pressure P to the laser control unit 2 (step S718).

Subsequently, the gas control unit 9 may perform partial gas replacement processing illustrated in FIG. 9 to be described later (step S719).

The gas control unit 9 may subsequently determine whether to end the partial gas replacement control (step S720). When having determined that the partial gas replacement control is not to be ended (N at step S720), the gas control unit 9 may return to the processing at step S712. When having determined that the partial gas replacement control is to be ended (Y at step S720), the gas control unit 9 may end the partial gas replacement control processing.

Figure 9:
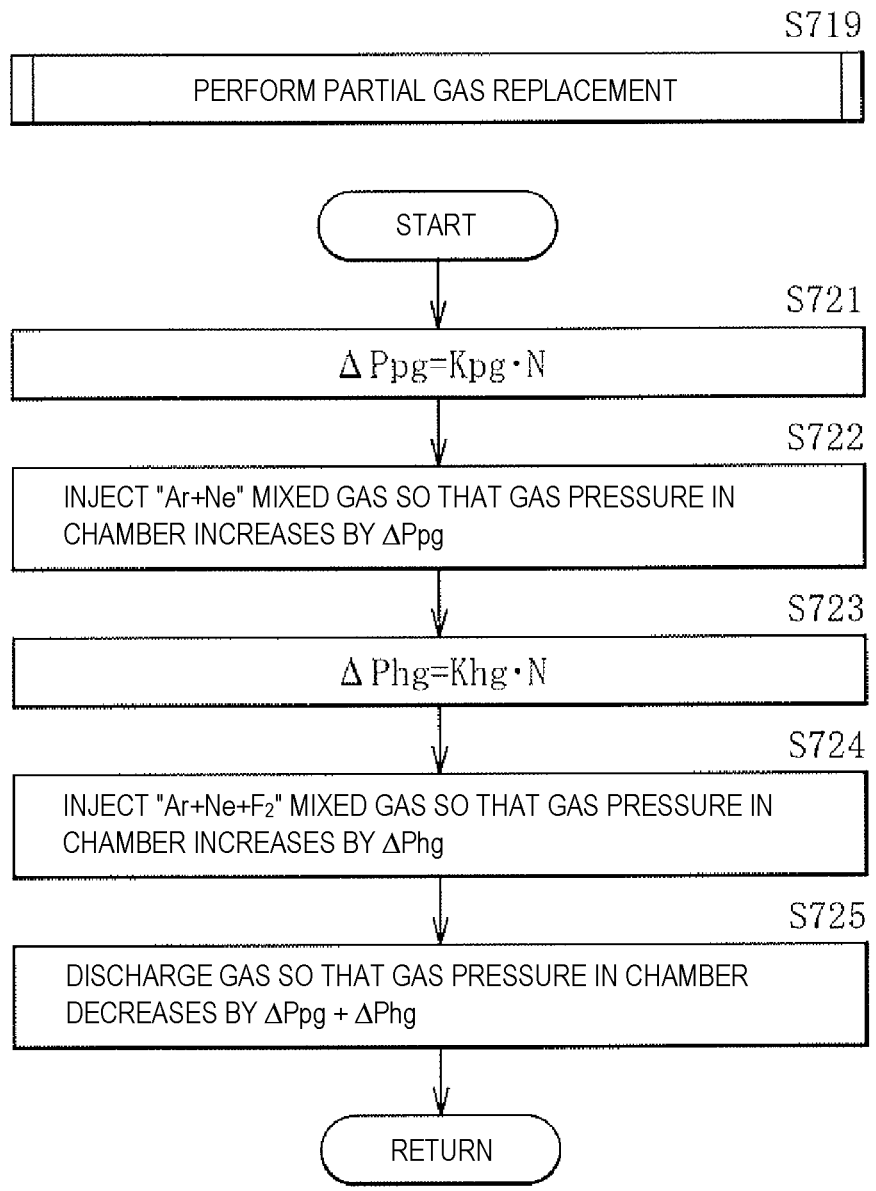
FIG. 9 is a sub flowchart of illustrating details of processing at step S719 in the flowchart illustrated in FIG. 8.

FIG. 9 is a sub flowchart of illustrating details of the processing at step S719 in the flowchart illustrated in FIG. 8.

The gas control unit 9 may calculate ΔPpg (=Kpg·N) from the injection coefficient Kpg of the "Ar+Ne" mixed gas and the pulse number N of laser oscillation in the partial gas replacement period Tpg (step S721).

Subsequently, the gas control unit 9 may inject the "Ar+Ne" mixed gas into the laser chamber 20 so that the gas pressure P in the laser chamber 20 increases by ΔPpg (step S722).

Subsequently, the gas control unit 9 may calculate ΔPhg (=Khg·N) from the injection coefficient Khg of the "Ar+Ne+$F_2$" mixed gas and the pulse number N of laser oscillation in the partial gas replacement period Tpg (step S723).

Subsequently, the gas control unit 9 may inject the "Ar+Ne+$F_2$" mixed gas into the laser chamber 20 so that the gas pressure P in the laser chamber 20 increases by ΔPhg (step S724).

Subsequently, the gas control unit 9 may discharge gas in the laser chamber 20 so that the gas pressure P in the laser chamber 20 decreases by $\Delta Ppg+\Delta Phg$ (step S725). Thereafter, the gas control unit 9 may perform the processing at step S720 in FIG. 8.

The injection of the "Ar+Ne" mixed gas and the injection of the "Ar+Ne+$F_2$" mixed gas may be simultaneously and collectively performed.

the above description of various types of control is made with an example in which various types of control gains are proportional coefficients, but the various types of control gains may be differential control coefficients and integral control coefficients in proportional-integral-differential (PID) control.

[1.3 Problem]

In the laser apparatus 101 and the laser apparatus management system according to the comparative example, when a control parameter is to be changed, the user of the laser apparatus 101 is requested to stop laser output operation, and a maintenance worker of the laser manufacturer directly operates the laser apparatus 101 to change the control parameter, and judges a result of the laser performance. Thus, a long down time can occur. Furthermore, with the laser apparatus 101 and the laser apparatus management system according to the comparative example, the laser performance difference before and after the control parameter change is not clearly obtained, and it is difficult to determine whether the control parameter change is OK.

<2. Embodiment 1> (Laser Apparatus and Laser Apparatus Management System Having Function to Change Control Parameter Reservation)

The following describes a laser apparatus and a laser apparatus management system according to Embodiment 1 of the present disclosure. In the following description, any component substantially identical to that of the laser apparatus 101 and the laser apparatus management system according to the comparative example described above is denoted by an identical reference sign, and description thereof will be omitted as appropriate.

[2.1 Configuration]

Figure 10:
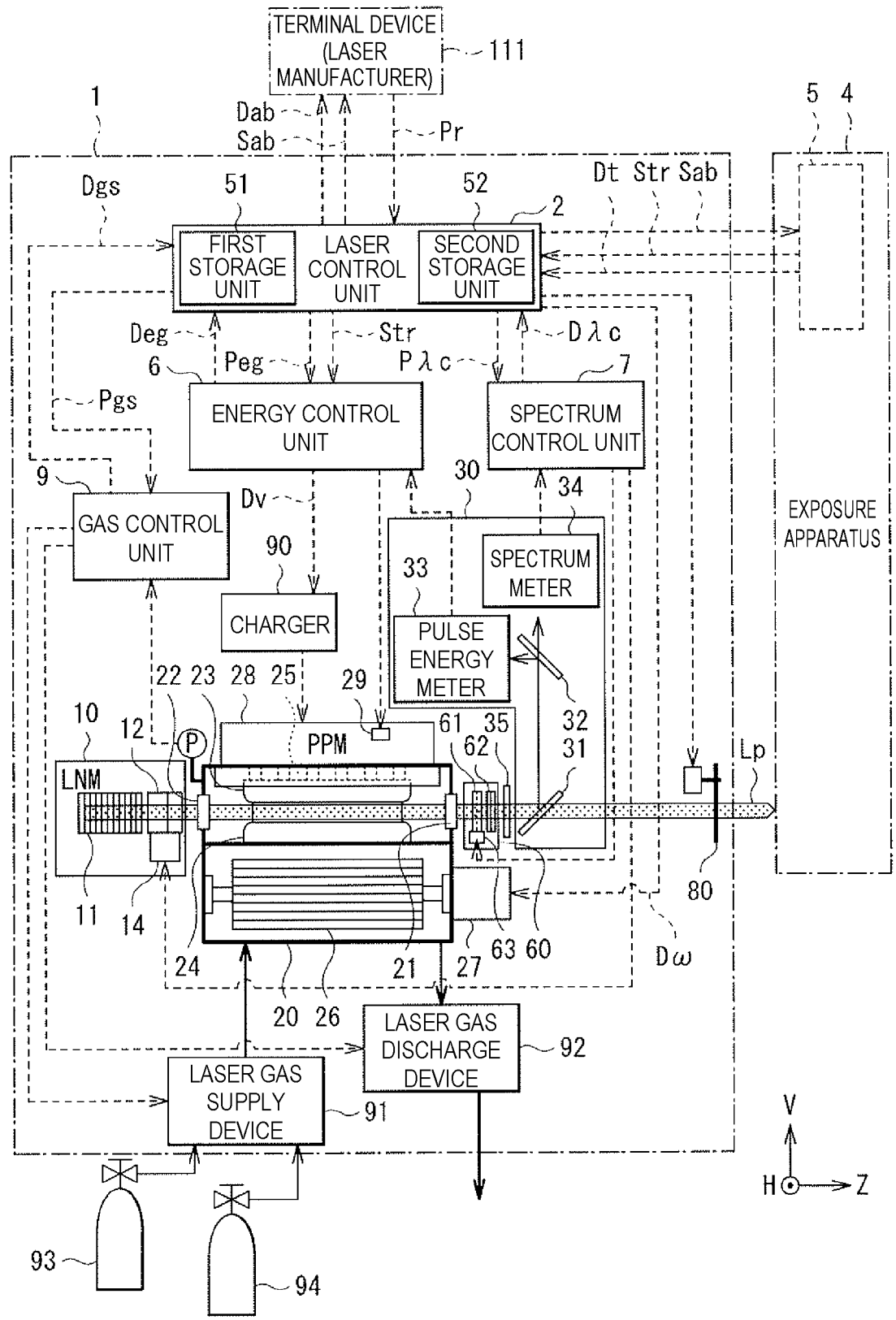
FIG. 10 schematically illustrates an exemplary configuration of a laser apparatus and a laser apparatus management system according to Embodiment 1.

FIG. 10 schematically illustrates an exemplary configuration of a laser apparatus 1 and a laser apparatus management system according to Embodiment 1.

The laser apparatus management system according to Embodiment 1 may include the laser apparatus 1 in place of the laser apparatus 101 according to the comparative example described above.

In the laser apparatus 1, the laser control unit 2 includes a first storage unit 51 and a second storage unit 52.

The first storage unit 51 may store a first laser control parameter. The first laser control parameter may include various types of control parameters before control parameter change in the adjustment oscillation for performing control parameter change illustrated in FIGS. 11 to 17 to be described later. The first laser control parameter may be a laser control parameter used before the adjustment oscillation for performing control parameter change, in other words, before laser output from the laser output unit to the exposure apparatus 4 is stopped. The various types of control parameters before control parameter change may include at least one of the energy control parameter Peg, the spectrum control parameter P$\lambda$c, and the gas control parameter Pgs as illustrated in FIG. 3.

The second storage unit 52 may store a second laser control parameter. The second laser control parameter may include various types of control parameters after control parameter change in the adjustment oscillation for performing control parameter change illustrated in FIGS. 11 to 17 to be described later. The various types of control parameters after control parameter change may include at least one of the energy control parameter Peg, the spectrum control parameter P$\lambda$c, and the gas control parameter Pgs as illustrated in FIG. 3.

A signal line through which a reservation control parameter Pr including change data of various types of control parameters in the laser apparatus 1 is transmitted from the terminal device 111 to the laser control unit 2 may be provided between the terminal device 111 and the laser control unit 2.

A signal line through which laser performance data Dab and a control parameter change result signal Sab are transmitted from the laser control unit 2 to the terminal device 111 may be provided between the terminal device 111 and the laser control unit 2. The control parameter change result signal Sab may include a control parameter change OK signal or a control parameter change NG signal in the adjustment oscillation for performing control parameter change illustrated in FIGS. 11 to 17 to be described later.

A signal line through which the control parameter change result signal Sab is transmitted from the laser control unit 2 to the exposure apparatus control unit 5 may be provided between the laser control unit 2 and the exposure apparatus control unit 5 of the exposure apparatus 4.

The laser performance data Dab may be laser performance data before and after control parameter change. The laser performance data Dab may include first laser performance data and second laser performance data.

The first laser performance data may be laser performance data obtained when the laser output unit performs laser oscillation based on the first laser control parameter while laser output from the laser output unit to the exposure apparatus 4 is stopped.

The second laser performance data may be laser performance data obtained when the laser output unit performs laser oscillation based on the second laser control parameter while laser output from the laser output unit to the exposure apparatus 4 is stopped.

The laser control unit 2 may be a control unit configured to determine whether the second laser performance data has been improved as compared to the first laser performance data while laser output from the laser output unit to the exposure apparatus 4 is stopped.

In the above description, the duration in which laser output from the laser output unit to the exposure apparatus 4 is stopped may be the duration in which the adjustment oscillation for performing control parameter change illustrated in FIGS. 11 to 17 is performed.

The laser control unit 2 may be a control unit configured to control, based on a result of the determination of whether the second laser performance data has been improved as compared to the first laser performance data, the laser output unit to perform laser output to the exposure apparatus 4 by using one of the first laser control parameter and the second laser control parameter.

When having determined that the second laser performance data has been improved, the laser control unit 2 may cause the laser output unit to perform laser output to the exposure apparatus 4 by using the second laser control parameter. When having determined that the second laser performance data has not been improved, the laser control unit 2 may cause the laser output unit to perform laser output to the exposure apparatus 4 by using the first laser control parameter.

The reservation control parameter Pr may include the second laser control parameter. The laser control unit 2 may receive the second laser control parameter from the terminal device 111 and store the received second laser control parameter in the second storage unit 52 before laser output from the laser output unit to the exposure apparatus 4 is stopped.

The other configuration may be substantially same as that of the laser apparatus 101 and the laser apparatus management system according to the comparative example described above.

[2.2 Operation]
(Control Parameter Change Control)

Figure 11:
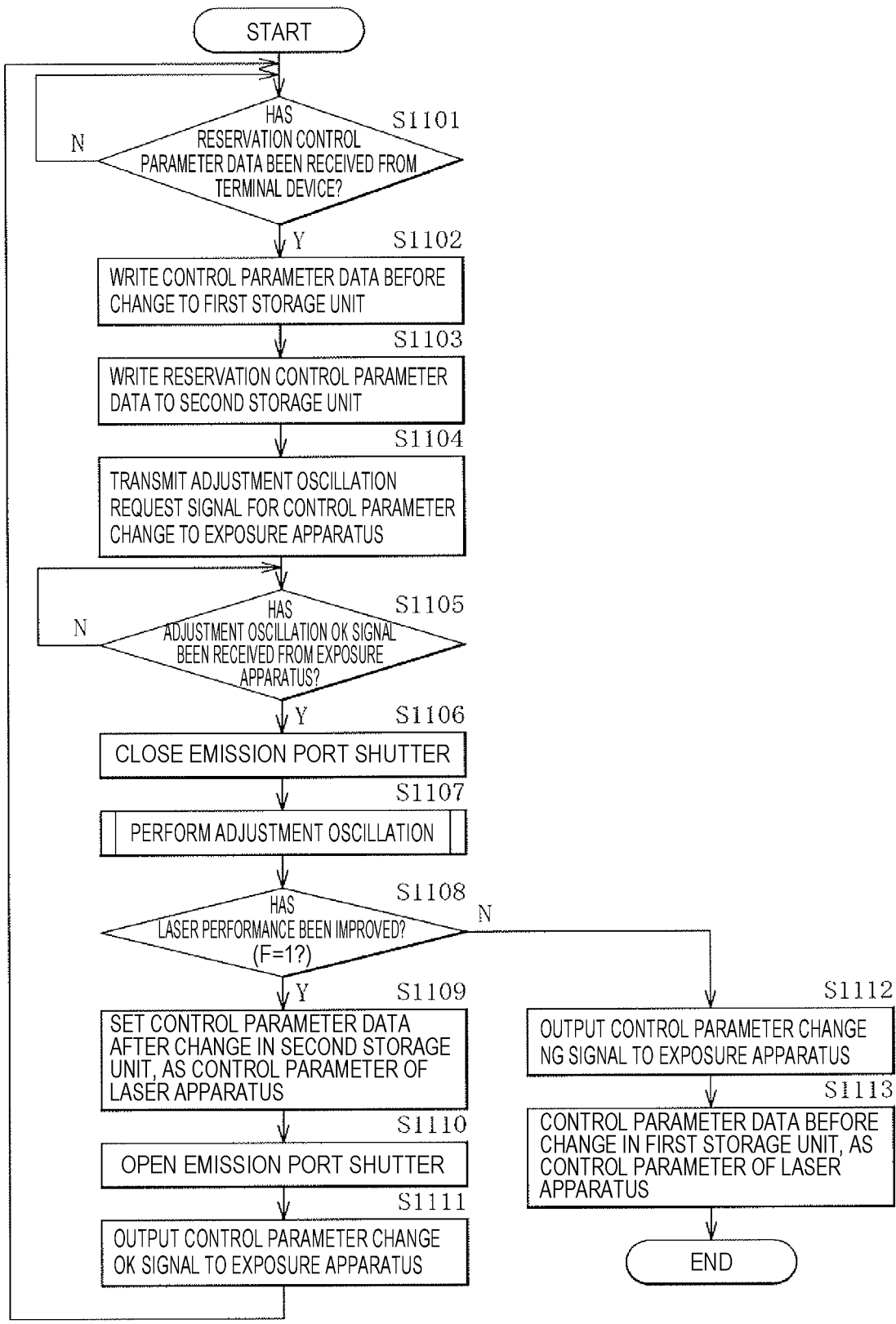
FIG. 11 is a flowchart illustrating exemplary control flow related to control parameter change by a laser control unit at the laser apparatus according to Embodiment 1.

FIG. 11 is a flowchart illustrating exemplary control flow related to control parameter change by the laser control unit 2 in the laser apparatus 1.

The laser control unit 2 determines whether data of the reservation control parameter Pr has been received from the terminal device 111 (step S1101). When having determined that no data of the reservation control parameter Pr has been received from the terminal device 111 (N at step S1101), the laser control unit 2 may repeat the processing at step S1101.

When having determined that data of the reservation control parameter Pr has been received from the terminal device 111 (Y at step S1101), the laser control unit 2 subsequently writes data of the control parameter before control parameter change to the first storage unit 51 (step S1102).

Subsequently, the laser control unit 2 writes the data of the reservation control parameter Pr to the second storage unit 52 (step S1103).

Subsequently, the laser control unit 2 transmits an adjustment oscillation request signal for the control parameter change to the exposure apparatus 4 (step S1104).

The laser control unit 2 determines whether an adjustment oscillation OK signal has been received from the exposure apparatus 4 (step S1105). When having determined that no adjustment oscillation OK signal has been received (N at step S1105), the laser control unit 2 may repeat the processing at step S1105.

When having determined that the adjustment oscillation OK signal has been received (Y at step S1105), the laser control unit 2 subsequently closes the emission port shutter 80 (step S1106) and performs the adjustment oscillation (step S1107). Through the adjustment oscillation in FIGS. 13 to 17 to be described later, the value of a flag F indicating whether the laser performance has been improved is obtained. The value of the flag F is 1 when the laser performance has been improved, and the value of the flag F is zero when the laser performance has not been improved.

The laser control unit 2 determines whether the laser performance has been improved (step S1108). The determination of whether the laser performance has been improved can be performed by determining whether the value of the flag F is "1".

When having determined that the laser performance has been improved (Y at step S1108), the laser control unit 2 subsequently sets data of a control parameter after the control parameter change in the second storage unit 52 as the control parameter of the laser apparatus 1 (step S1109). Subsequently, the laser control unit 2 opens the emission port shutter 80 (step S1110), outputs the control parameter change OK signal to the exposure apparatus 4 (step S1111), and then may return to the processing at step S1101. In the processing at step S1111, the laser control unit 2 may also output the control parameter change OK signal to the terminal device 111.

When having determined that the laser performance has not been improved (N at step S1108), the laser control unit 2 may subsequently output the control parameter change NG signal to the exposure apparatus 4 (step S1112), and then set data of a control parameter before the control parameter change in the first storage unit 51 as the control parameter of the laser apparatus 1 (step S1113), and may end the processing. In the processing at step S1112, the laser control unit 2 may also output the control parameter change NG signal to the terminal device 111.

Figure 12:
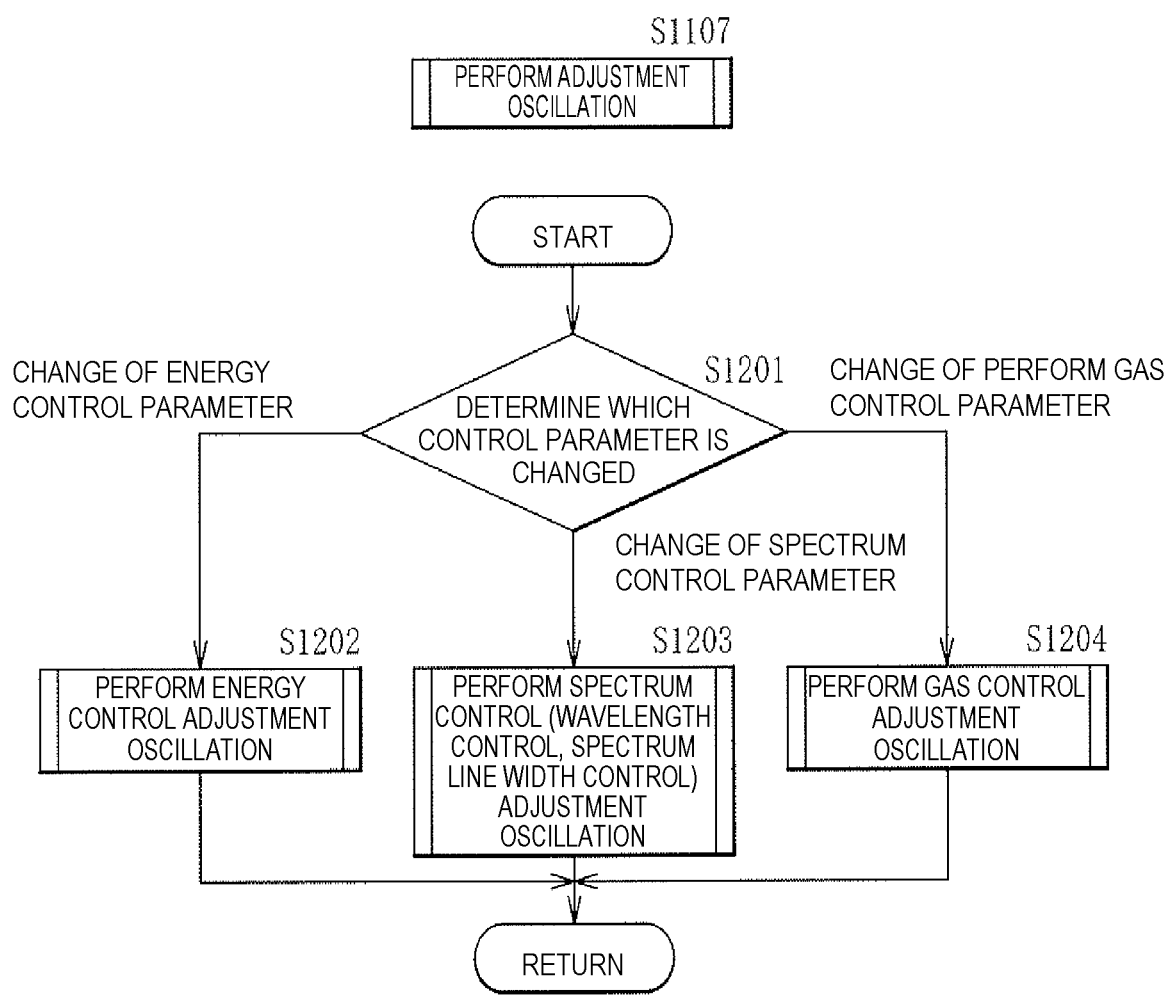
FIG. 12 is a sub flowchart of illustrating details of adjustment oscillation processing at step S1107 in the flowchart illustrated in FIG. 11.

FIG. 12 is a sub flowchart of illustrating details of the adjustment oscillation processing at step S1107 in the flowchart illustrated in FIG. 11.

First, the laser control unit 2 determines which control parameter is changed (step S1201).

When the change is made on the energy control parameter Peg, the laser control unit 2 performs energy control adjustment oscillation (step S1202), and proceeds to the processing at step S1108 in FIG. 11.

When the change is made on the spectrum control parameter Pλc, the laser control unit 2 performs spectrum control adjustment oscillation (step S1203), and proceeds to the processing at step S1108 in FIG. 11. When the change of the spectrum control parameter Pλc is made on the wavelength control parameter, the laser control unit 2 performs wavelength control adjustment oscillation. When the change of the spectrum control parameter Pλc is made on the spectrum line width control parameter, the laser control unit 2 performs spectrum line width control adjustment oscillation.

When the change is made on the gas control parameter Pgs, the laser control unit 2 performs gas control adjustment oscillation (step S1204), and proceeds to the processing at step S1108 in FIG. 11.

In the example of FIG. 12, changes of the energy control parameter Peg, the spectrum control parameter Pλc, and the gas control parameter Pgs are separately performed, but the control parameters may be simultaneously changed unless control interference occurs due to the changes of the control parameters. In particular, the energy control parameter Peg and the spectrum control parameter Pλc can be simultaneously changed because control interference is unlikely to occur due to the control parameter change.

(Energy Control Adjustment Oscillation)

Figure 13:
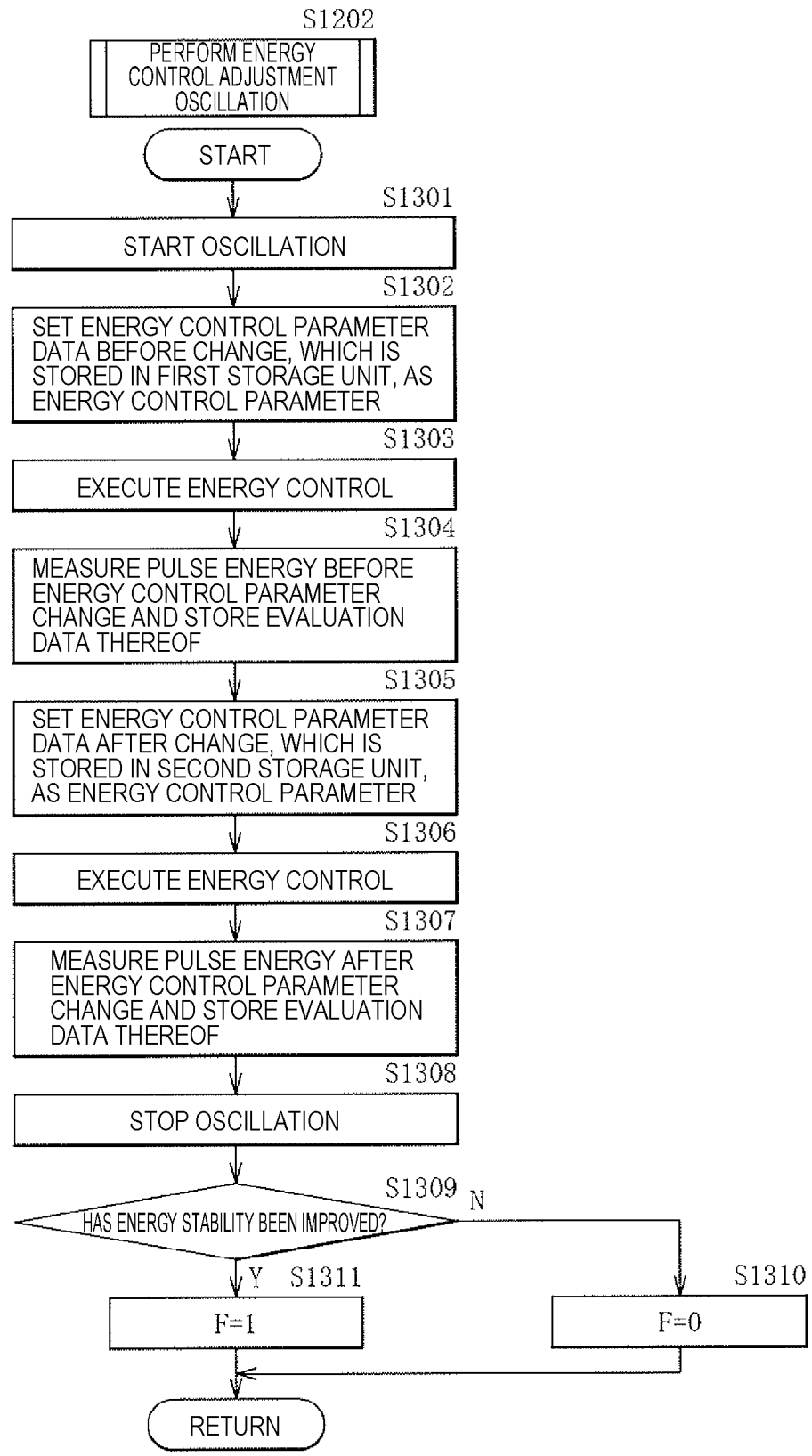
FIG. 13 is a sub flowchart of illustrating details of energy control adjustment oscillation processing at step S1202 in the flowchart illustrated in FIG. 12.

FIG. 13 is a sub flowchart of illustrating details of the energy control adjustment oscillation processing at step S1202 in the flowchart illustrated in FIG. 12. The laser control unit 2 mainly controls the energy control unit 6 to perform the energy control adjustment oscillation.

The laser control unit 2 starts the adjustment oscillation (step S1301). In the adjustment oscillation, laser oscillation is performed at a predetermined repetition frequency in response to an internal trigger of the laser apparatus 1, not the light emission trigger signal Str as an external trigger from the exposure apparatus control unit 5. In the adjustment oscillation, oscillation is preferably performed in the burst operation similar to actual exposure. For example, the burst operation may include the oscillation duration of 0.5 s (second) at 6 kHz and the stop time of 0.2 s.

Subsequently, the laser control unit 2 sets data of the energy control parameter Peg before the change, which is stored in the first storage unit 51, as the energy control parameter Peg (step S1302), and executes the energy control (step S1303).

Subsequently, the laser control unit 2 measures the pulse energy before the change of the energy control parameter Peg, and stores evaluation data thereof (step S1304). The evaluation data of the pulse energy may be, for example, an energy stability $E\sigma$ (%) of the pulse energy. The energy stability $E\sigma$ of the pulse energy may be the standard deviation $\sigma$ of the pulse energy. The laser control unit 2 may transmit the evaluation data to the terminal device 111.

Subsequently, the laser control unit 2 sets data of the energy control parameter Peg after the change, which is stored in the second storage unit 52, as the energy control parameter Peg (step S1305), and executes the energy control (step S1306). The changed energy control parameter Peg may be, for example, the pulse energy control gain Vk.

Subsequently, the laser control unit 2 measures the pulse energy after the change of the energy control parameter Peg, and stores evaluation data thereof (step S1307). The evaluation data of the pulse energy may be, for example, the energy stability $E\sigma$ (%) of the pulse energy. The energy stability $E\sigma$ of the pulse energy may be the standard deviation $\sigma$ of the pulse energy. The laser control unit 2 may transmit the evaluation data to the terminal device 111.

Subsequently, the laser control unit 2 stops the adjustment oscillation (step S1309), and determines whether the energy stability has been improved (step S1309). The determination of whether the energy stability has been improved may be performed by determining whether the value of the energy stability $E\sigma$ has decreased through the control parameter change.

When having determined that the energy stability has been improved (Y at step S1309), the laser control unit 2 sets the value of the flag F to be "1" (step S1311), and may proceed to processing at step S1108 in FIG. 11. When having determined that the energy stability has not been improved (N at step S1309), the laser control unit 2 sets the value of the flag F to be "0" (step S1310), and may proceed to processing at step S1108 in FIG. 11.

(Wavelength Control Adjustment Oscillation)

Figure 14:
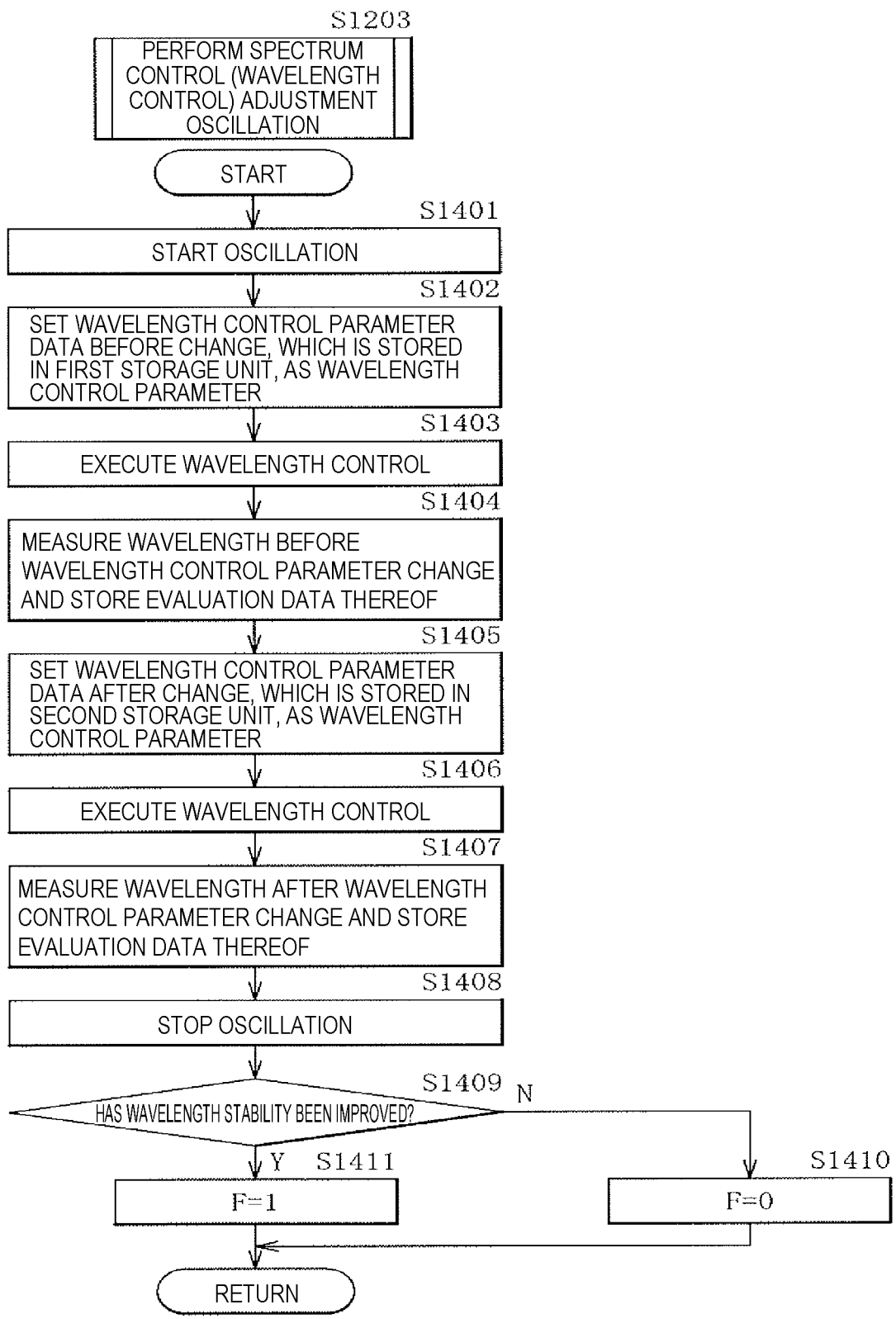
FIG. 14 is a sub flowchart of illustrating details of wavelength control adjustment oscillation processing at step S1203 in the flowchart illustrated in FIG. 12.

FIG. 14 is a sub flowchart of illustrating details of the wavelength control adjustment oscillation processing at step S1203 in the flowchart illustrated in FIG. 12. The laser control unit 2 mainly controls the spectrum control unit 7 to perform the wavelength control adjustment oscillation.

The laser control unit 2 starts the adjustment oscillation (step S1401). In the adjustment oscillation, laser oscillation is performed at a predetermined repetition frequency in response to an internal trigger of the laser apparatus 1, not the light emission trigger signal Str as an external trigger from the exposure apparatus control unit 5. In the adjustment oscillation, oscillation is preferably performed in the burst operation similar to actual exposure. For example, the burst operation may include the oscillation duration of 0.5 s (second) at 6 kHz and the stop time of 0.2 s.

Subsequently, the laser control unit 2 sets data of the wavelength control parameter before the change, which is stored in the first storage unit 51, as the wavelength control parameter (step S1402), and executes the wavelength control (step S1403).

Subsequently, the laser control unit 2 measures the wavelength before the change of the wavelength control parameter, and stores evaluation data thereof (step S1404). The evaluation data of the wavelength may be, for example, a wavelength stability $\lambda\sigma$. The wavelength stability $\lambda\sigma$ may be, for example, the standard deviation value $\delta\lambda\sigma$ of the difference $\delta\lambda$ ($=\lambda-\lambda t$) between the measured wavelength $\lambda$ and the target wavelength $\lambda t$. The laser control unit 2 may transmit the evaluation data to the terminal device 111.

Subsequently, the laser control unit 2 sets data of the wavelength control parameter after the change, which is stored in the second storage unit 52, as the wavelength control parameter (step S1405), and executes the wavelength control (step S1406). The changed wavelength control parameter may be, for example, the wavelength control gain $\lambda k$.

Subsequently, the laser control unit 2 measures the wavelength after the change of the wavelength control parameter, and stores evaluation data thereof (step S1407). The evaluation data of the wavelength may be, for example, the wavelength stability $\lambda\sigma$. The wavelength stability $\lambda\sigma$ may be, for example, the standard deviation value $\delta\lambda\sigma$ of the difference $\delta\lambda$ ($=\lambda-\lambda t$) between the measured wavelength $\lambda$ and the target wavelength $\lambda t$. The laser control unit 2 may transmit the evaluation data to the terminal device 111.

Subsequently, the laser control unit 2 stops the adjustment oscillation (step S1408), and determines whether the wavelength stability has been improved (step S1409). The determination of whether the wavelength stability has been improved may be performed by determining whether the value of the wavelength stability $\lambda\sigma$ has decreased through the control parameter change.

When having determined that the wavelength stability has been improved (Y at step S1409), the laser control unit 2 sets the value of the flag F to be "1" (step S1411), and may proceed to processing at step S1108 in FIG. 11. When having determined that the wavelength stability has not been improved (N at step S1409), the laser control unit 2 sets the value of the flag F to be "0" (step S1410), and may proceed to processing at step S1108 in FIG. 11.

(Spectrum Line Width Control Adjustment Oscillation)

Figure 15:
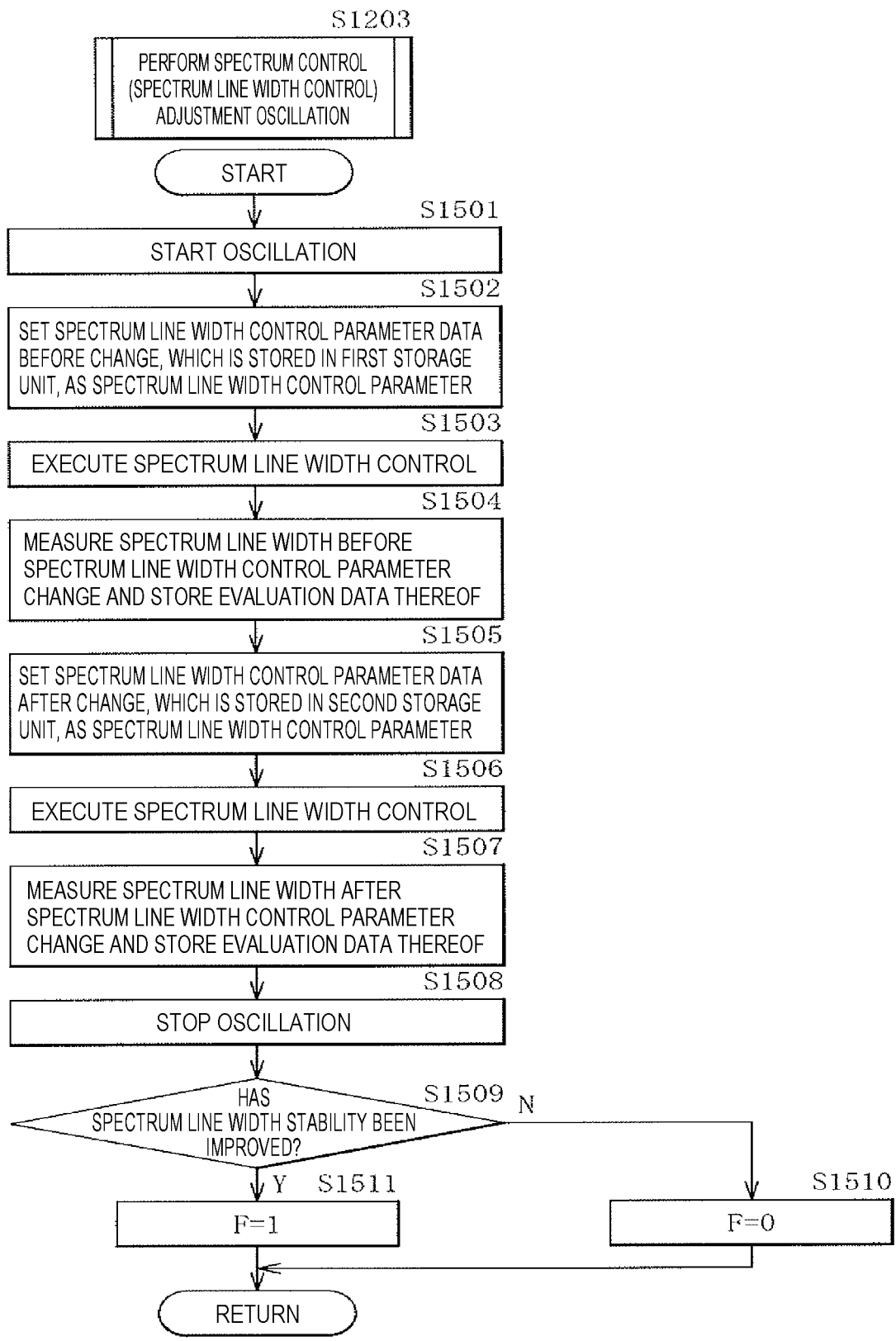
FIG. 15 is a sub flowchart of illustrating details of spectrum line width control adjustment oscillation processing at step S1203 in the flowchart illustrated in FIG. 12.

FIG. 15 is a sub flowchart of illustrating details of the spectrum line width control adjustment oscillation processing at step S1203 in the flowchart illustrated in FIG. 12. The laser control unit 2 controls mainly the spectrum control unit 7 to perform the spectrum line width control adjustment oscillation.

The laser control unit 2 starts the adjustment oscillation (step S1501). In the adjustment oscillation, laser oscillation is performed at a predetermined repetition frequency in response to an internal trigger of the laser apparatus 1, not the light emission trigger signal Str as an external trigger from the exposure apparatus control unit 5. In the adjustment oscillation, oscillation is preferably performed in the burst operation similar to actual exposure. For example, the burst operation may include the oscillation duration of 0.5 s (second) at 6 kHz and the stop time of 0.2 s.

Subsequently, the laser control unit 2 sets data of the spectrum line width control parameter before the change, which is stored in the first storage unit 51, as the spectrum line width control parameter (step S1502), and executes the spectrum line width control (step S1503).

Subsequently, the laser control unit 2 measures the spectrum line width before the change of the spectrum line width control parameter, and stores evaluation data thereof (step S1504). The evaluation data of the spectrum line width may be, for example, a spectrum line width stability $\Delta\lambda\sigma$. The spectrum line width stability $\Delta\lambda\sigma$ may be the standard deviation value $\Delta\Delta\lambda\sigma$ of the difference $\Delta\Delta\lambda$ ($=\Delta\lambda-\Delta\lambda t$) between the measured spectrum line width $\Delta\lambda$ and the target spectrum line width $\Delta\lambda t$. The laser control unit 2 may transmit the evaluation data to the terminal device 111.

Subsequently, the laser control unit 2 sets data of the spectrum line width control parameter after the change, which is stored in the second storage unit 52, as the spectrum line width control parameter (step S1505), and executes the spectrum line width control (step S1506). The changed spectrum line width control parameter may be, for example, the spectrum line width control gain $\Delta\lambda k$.

Subsequently, the laser control unit 2 measures the spectrum line width after the change of the spectrum line width control parameter, and stores evaluation data thereof (step S1507). The evaluation data of the spectrum line width may be, for example, the spectrum line width stability $\Delta\lambda\sigma$. The spectrum line width stability $\Delta\lambda\sigma$ may be the standard deviation value $\Delta\Delta\lambda\sigma$ of the difference $\Delta\Delta\lambda$ ($=\Delta\lambda-\Delta\lambda t$) between the measured spectrum line width $\Delta\lambda$ and the target spectrum line width $\Delta\lambda t$. The laser control unit 2 may transmit the evaluation data to the terminal device 111.

Subsequently, the laser control unit 2 stops the adjustment oscillation (step S1508), and determines whether the spectrum line width stability has been improved (step S1509). The determination of whether the spectrum line width stability has been improved may be performed by determining whether the value of the spectrum line width stability $\Delta\lambda\sigma$ has decreased through the control parameter change.

When having determined that the spectrum line width stability has been improved (Y at step S1509), the laser control unit 2 sets the value of the flag F to be "1" (step S1511), and may proceed to processing at step S1108 in FIG. 11. When having determined that the spectrum line width stability has not been improved (N at step S1509), the laser control unit 2 sets the value of the flag F to be "0" (step S1510), and may proceed to processing at step S1108 in FIG. 11.

(First Exemplary Gas Control Adjustment Oscillation)

Figure 16:
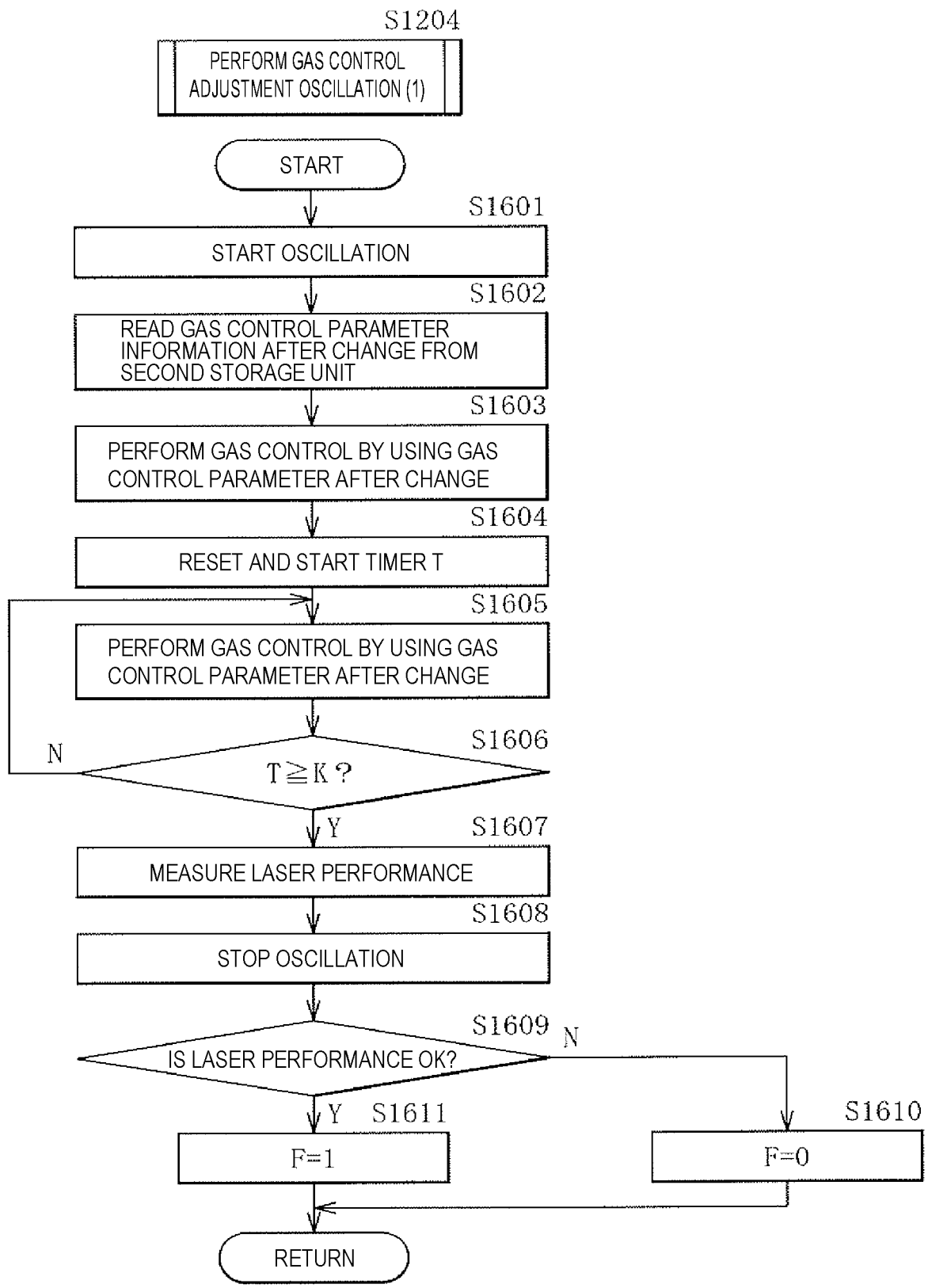
FIG. 16 is a sub flowchart of illustrating first exemplary gas control adjustment oscillation processing at step S1204 in the flowchart illustrated in FIG. 12.

FIG. 16 is a sub flowchart of illustrating first exemplary gas control adjustment oscillation processing at step S1204 in the flowchart illustrated in FIG. 12. The laser control unit 2 mainly controls the gas control unit 9 to perform the gas control adjustment oscillation. In the first exemplary gas control adjustment oscillation processing in FIG. 16, it is determined whether the laser performance becomes OK in a predetermined time.

The laser control unit 2 starts the adjustment oscillation (step S1601). In the adjustment oscillation, laser oscillation is performed at a predetermined repetition frequency in response to an internal trigger of the laser apparatus 1, not the light emission trigger signal Str as an external trigger from the exposure apparatus control unit 5. In the adjustment oscillation, oscillation is preferably performed in the burst operation similar to actual exposure. For example, the burst operation may include the oscillation duration of 0.5 s (second) at 6 kHz and the stop time of 0.2 s.

Subsequently, the laser control unit 2 reads information of the gas control parameter Pgs after the change, which is stored in the second storage unit 52 (step S1602), and performs the gas control by using the gas control parameter Pgs after the change (step S1603). For example, increase of the maximum control gas pressure Pmax may be assumed as the change of the gas control parameter Pgs.

Subsequently, the laser control unit 2 resets and starts the timer T (step S1604). Subsequently, the laser control unit 2 performs the gas control by using the gas control parameter Pgs after the change (step S1605).

Subsequently, the laser control unit 2 determines whether the value of the timer T has reached a predetermined time K (step S1606). When having determined that the value of the timer T has not reached the predetermined time K (N at step S1606), the laser control unit 2 may return to the processing at step S1605.

When having determined that the value of the timer T has reached the predetermined time K (Y at step S1606), the laser control unit 2 subsequently measures the laser performance (step S1607). In the measurement of the laser performance, for example, a value such as the energy stability $E\sigma$ or the charge voltage V may be measured. The laser control unit 2 may transmit a result of the measurement to the terminal device 111.

Subsequently, the laser control unit 2 stops the adjustment oscillation (step S1608), and determines whether the laser performance is OK (step S1609). The determination of whether the laser performance is OK may be performed by, for example, determining whether the value such as the energy stability $E\sigma$ or the charge voltage V is in an allowable range.

When having determined that the laser performance is OK (Y at step S1609), the laser control unit 2 sets the value of the flag F to be "1" (step S1611), and may proceed to processing at step S1108 in FIG. 11. When having determined that the laser performance is not OK (N at step S1609), the laser control unit 2 sets the value of the flag F to be "0" (step S1610), and may proceed to processing at step S1108 in FIG. 11.

(Second Exemplary Gas Control Adjustment Oscillation)

Figure 17:
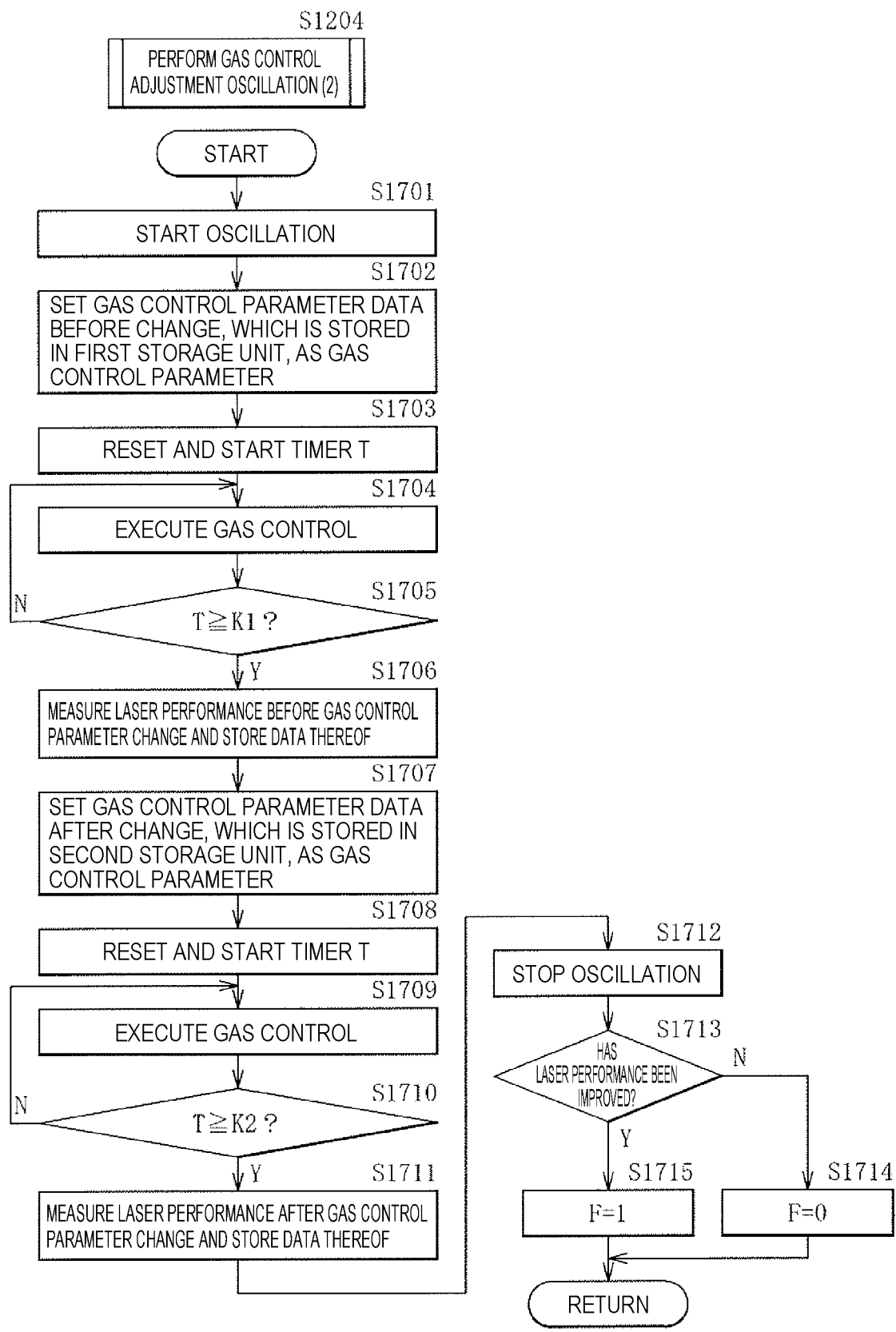
FIG. 17 is a sub flowchart of illustrating second exemplary gas control adjustment oscillation processing at step S1204 in the flowchart illustrated in FIG. 12.

FIG. 17 is a sub flowchart of illustrating second exemplary gas control adjustment oscillation processing at step S1204 in the flowchart illustrated in FIG. 12. The laser control unit 2 mainly controls the gas control unit 9 to perform the gas control adjustment oscillation. In the second exemplary gas control adjustment oscillation processing in FIG. 17, the laser performance is measured before and after the change of the gas control parameter Pgs and subjected to determination.

The laser control unit 2 starts the adjustment oscillation (step S1701). In the adjustment oscillation, laser oscillation is performed at a predetermined repetition frequency in response to an internal trigger of the laser apparatus 1, not the light emission trigger signal Str as an external trigger from the exposure apparatus control unit 5. In the adjustment oscillation, oscillation is preferably performed in the burst operation similar to actual exposure. For example, the burst operation may include the oscillation duration of 0.5 s (second) at 6 kHz and the stop time of 0.2 s.

Subsequently, the laser control unit 2 sets data of the gas control parameter Pgs before the change, which is stored in the first storage unit 51, as the gas control parameter Pgs (step S1702), and resets and starts the timer T (step S1703). Subsequently, the laser control unit 2 executes the gas control (step S1704).

Subsequently, the laser control unit 2 determines whether the value of the timer T has reached a predetermined time K1 (step S1705). When having determined that the value of the timer T has not reached the predetermined time K1 (N at step S1705), the laser control unit 2 may return to the processing at step S1704.

When having determined that the value of the timer T has reached the predetermined time K1 (Y at step S1705), the laser control unit 2 subsequently measures the laser performance before the change of the gas control parameter Pgs, and stores evaluation data thereof (step S1706). In the measurement of the laser performance, for example, the value such as the energy stability $E\sigma$ or the charge voltage V may be measured. The laser control unit 2 may transmit the evaluation data to the terminal device 111.

Subsequently, the laser control unit 2 sets data of the gas control parameter Pgs after the change, which is stored in the second storage unit 52, as the gas control parameter Pgs (step S1707), and resets and starts the timer T (step S1708). The changed gas control parameter Pgs may be, for example, the maximum control gas pressure Pmax. Subsequently, the laser control unit 2 executes the gas control (step S1709).

Subsequently, the laser control unit 2 determines whether the value of the timer T has reached a predetermined time K2 (step S1710). The values of the predetermined time K1 and the predetermined time K2 may have the relation of K2≥K1. When having determined that the value of the timer T has not reached the predetermined time K2 (N at step S1710), the laser control unit 2 may return to the processing at step S1709.

When having determined that the value of the timer T has reached the predetermined time K2 (Y at step S1710), the laser control unit 2 subsequently measures the laser performance after the change of the gas control parameter Pgs, and stores evaluation data thereof (step S1711). In the measurement of the laser performance, for example, the value such as the energy stability Eσ or the charge voltage V may be measured. The laser control unit 2 may transmit the evaluation data to the terminal device 111.

Subsequently, the laser control unit 2 stops the adjustment oscillation (step S1712), and determines whether the laser performance has been improved (step S1713). The determination of whether the laser performance has been improved may be performed by determining whether a laser performance value such as the energy stability Eσ has decreased through the control parameter change.

When having determined that the laser performance has been improved (Y at step S1713), the laser control unit 2 sets the value of the flag F to be "1" (step S1715), and may proceed to processing at step S1108 in FIG. 11. When having determined that the laser performance has not been improved (N at step S1713), the laser control unit 2 sets the value of the flag F to be "0" (step S1714), and may proceed to processing at step S1108 in FIG. 11.

The other operation may be substantially same as that of the laser apparatus 101 and the laser apparatus management system according to the comparative example described above.

[2.3 Effect]

With the laser apparatus 1 and the laser apparatus management system according to Embodiment 1, it is possible to determine whether control parameter change is effective based on data of the laser performance before and after the control parameter change. When the change is effective, the laser performance is improved through the control parameter change.

As illustrated in FIG. 11, it is possible to determine whether change of a control parameter is effective by performing control with the changed control parameter and thereafter determining whether the laser performance is OK. When the change is effective, the laser performance is improved through the control parameter change.

(Other)

Although the laser control unit 2 and the terminal device 111 are directly connected with each other in the example in Embodiment 1, they may be connected through a network. Data such as the reservation control parameter Pr, the laser performance data Dab, and the control parameter change result signal Sab may be transmitted and received between the laser control unit 2 and the terminal device 111 through the network.

<3. Embodiment 2> (Laser Apparatus and Laser Apparatus Management System Having Function to Change Control Parameter Reservation Through Server)

The following describes a laser apparatus and a laser apparatus management system according to Embodiment 2 of the present disclosure. In the following description, any component substantially identical to that of the laser apparatus and the laser apparatus management system according to the comparative example or Embodiment 1 described above is denoted by an identical reference sign, and description thereof will be omitted as appropriate.

[3.1 Configuration]

Figure 18:
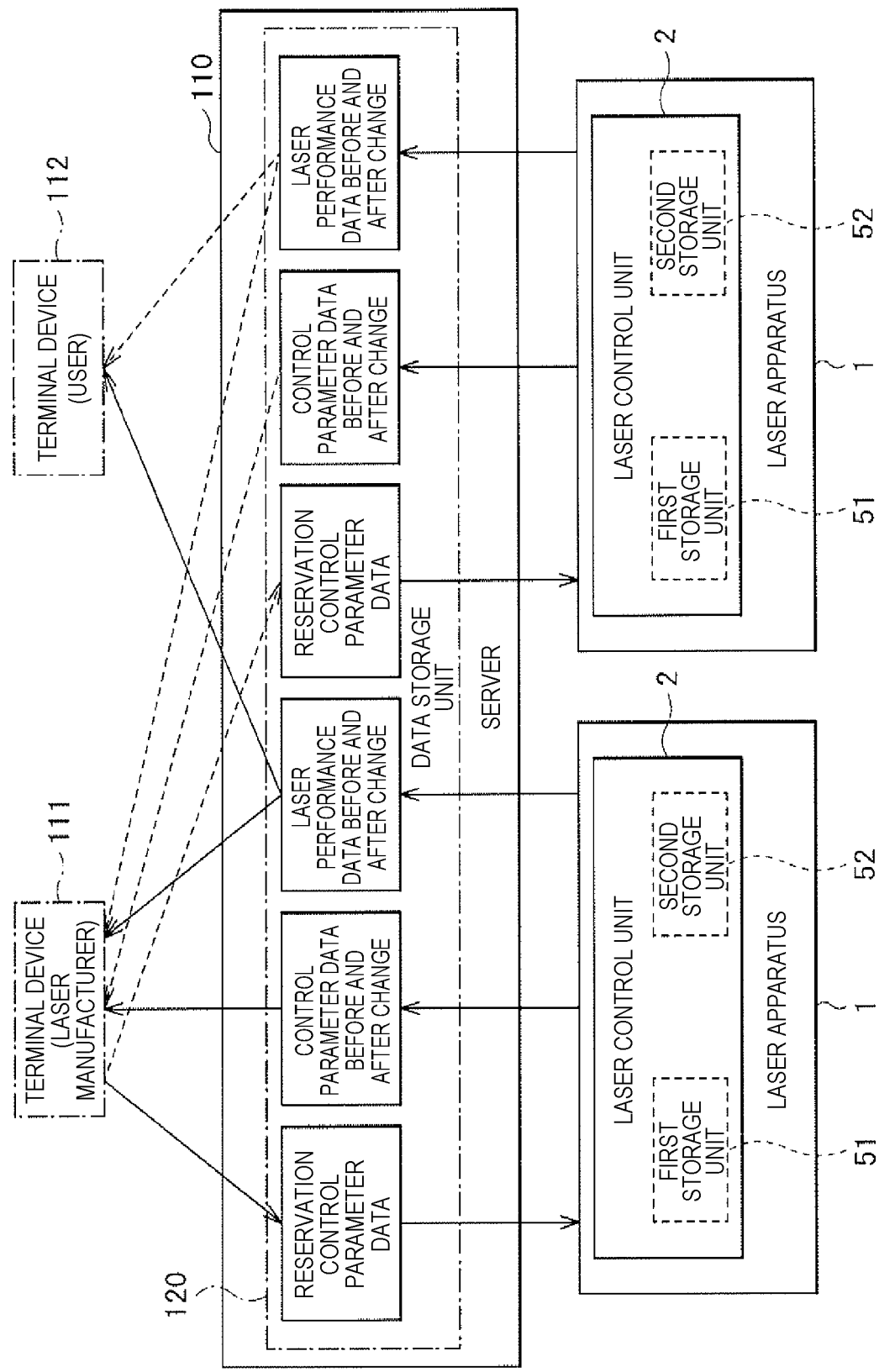
FIG. 18 schematically illustrates an exemplary configuration of a laser apparatus and a laser apparatus management system according to Embodiment 2.

FIG. 18 schematically illustrates an exemplary configuration of the laser apparatus and the laser apparatus management system according to Embodiment 2.

The laser apparatus management system according to Embodiment 2 may include a server 110 and a terminal device 112 in addition to the configuration of the laser apparatus management system according to Embodiment 1.

The terminal device 111 may be a terminal such as a personal computer (PC) operated by the laser manufacturer of the laser apparatus 1. The terminal device 112 may be a terminal such as a PC operated by the user of the laser apparatus 1.

The terminal device 111, the terminal device 112, and the laser control unit 2 may be each connected with the server 110 through a signal line through which various types of data can be transmitted and received.

The laser apparatus management system according to Embodiment 2 may include a plurality of laser apparatuses 1. The laser control unit 2 of each laser apparatus 1 may be connected with the server 110 through a signal line through which various types of data can be transmitted and received.

In the laser apparatus management system according to Embodiment 2, data such as the reservation control parameter Pr, the laser performance data Dab, and the control parameter change result signal Sab as the second laser control parameter is transmitted and received between the laser control unit 2 and the terminal device 111 through the server 110.

In the laser apparatus management system according to Embodiment 2, the reservation control parameter Pr is transmitted from the server 110 before laser output from the laser output unit to the exposure apparatus 4 is stopped for control parameter change.

In the laser apparatus management system according to Embodiment 2, the laser control unit 2 receives data of the reservation control parameter Pr from the server 110 connected with the terminal device 111 before laser output from the laser output unit to the exposure apparatus 4 is stopped for control parameter change, and stores the received data in the second storage unit 52.

The laser control unit 2 may include a performance data transmission unit configured to transmit, to the server 110, the laser performance data Dab including the first laser performance data after the control parameter change and the second laser performance data after the control parameter change.

The server 110 includes a data storage unit 120. The data storage unit 120 includes a control parameter storage unit configured to store the data of the reservation control parameter Pr transmitted from the terminal device 111. The data storage unit 120 also includes a performance data storage unit configured to store the laser performance data Dab including the first laser performance data and the second laser performance data and transmitted from the performance data transmission unit of the laser control unit 2. The data storage unit 120 also includes a storage unit configured to store control parameter data before and after the control parameter change. The data storage unit 120 may store the control parameter change result signal Sab including the control parameter change OK signal or the control parameter change NG signal.

In the laser apparatus management system according to Embodiment 2 as well, the laser control unit 2 is preferably provided with the first storage unit 51 and the second storage unit 52. However, the laser control unit 2 may be provided with no first storage unit 51 nor second storage unit 52, data of various types of control parameters before and after the control parameter change may be stored in the data storage unit 120 on the server 110 side, and the laser control unit 2 may perform control parameter change control by using the various types of control parameters stored in the data storage unit 120.

The other configuration may be substantially same as that of the laser apparatus and the laser apparatus management system according to the comparative example or Embodiment 1 described above.

[3.2 Operation]

When data of the reservation control parameter Pr is transmitted from the terminal device 111 to the server 110, the server 110 stores the data of the reservation control parameter Pr in the data storage unit 120, and transmits the reservation control parameter Pr to the laser control unit 2 of the laser apparatus 1.

Having received the reservation control parameter Pr from the server 110, the laser control unit 2 may perform control parameter change control substantially same as that in Embodiment 1.

Before the control parameter change, the laser control unit 2 operates the laser apparatus 1 in a first oscillation pattern in response to an internal trigger, and transmits the energy control related data Deg, the spectrum control related data D$\lambda$c, and the gas control related data Dgs, which are measured in the operation to the server 110 as laser performance data in the adjustment oscillation before the control parameter change. The server 110 stores the laser performance data in the data storage unit 120.

After the control parameter change, the laser control unit 2 operates the laser apparatus 1 in a second oscillation pattern in response to an internal trigger, and transmits the energy control related data Deg, the spectrum control related data D$\lambda$c, and the gas control related data Dgs, which are measured in the operation to the server 110 as data of the laser performance in the adjustment oscillation after the control parameter change. The server 110 stores the laser performance data in the data storage unit 120.

The laser control unit 2 also transmits, to the server 110, control parameter data before and after the control parameter change, and the control parameter change result signal Sab including the control parameter change OK signal or the control parameter change NG signal. The server 110 stores this data in the data storage unit 120.

The server 110 may set reference authorization to data stored in the data storage unit 120 in accordance with the contents thereof. For example, the server 110 may set, to the control parameter data before and after the control parameter change, reference authorization that allows reference from the terminal device 111. However, reference authorization that allows reference from the terminal device 112 may be set to the control parameter data before and after the control parameter change. For example, the server 110 may set, to data of the control parameter change result signal Sab including the control parameter change OK signal or the control parameter change NG signal, reference authorization that allows reference from the terminal device 111 and the terminal device 112. For example, the server 110 may set, to the laser performance data Dab before and after the control parameter change, reference authorization that allows reference from the terminal device 111 and the terminal device 112.

The terminal device 111 may be capable of browsing, among data stored in the data storage unit 120 of the server 110, at least the control parameter data before and after the control parameter change, the laser performance data Dab before and after the control parameter change, and data of the control parameter change result signal Sab.

The terminal device 112 may be capable of browsing, among data stored in the data storage unit 120 of the server 110, at least the control parameter data before and after the control parameter change, the laser performance data Dab before and after the control parameter change, and data of the control parameter change result signal Sab. However, the control parameter data before and after the control parameter change may be set not to be browsed from the terminal device 112.

(Various Types of Control Parameters Before and After Change)

FIG. 19 schematically illustrates exemplary data of various types of control parameters before and after control parameter change, which is stored in the server 110 in the laser apparatus management system according to Embodiment 2.

The server 110 may store, in the data storage unit 120, data of a control parameter before and after the change, which is related to the gas control parameter Pgs. The control parameter before and after the change, which is related to the gas control parameter Pgs may include minimum charge voltages Vmina and Vminb, maximum charge voltages Vmaxa and Vmaxb, maximum control gas pressures Pmaxa and Pmaxb, gas pressure variable amounts $\Delta$Pa and $\Delta$Pb, partial gas replacement periods Tpga and Tpgb, injection coefficients Kpga and Kpgb of the buffer gas, injection coefficients Khga and Khgb of the fluorine-containing gas.

The server 110 may store, in the data storage unit 120, data of a control parameter before and after the change, which is related to the spectrum control parameter P$\lambda$c. The control parameter before and after the change, which is related to the spectrum control parameter P$\lambda$c may include wavelength control gains $\lambda$ka and $\lambda$kb, initial angles $\theta$0a and $\theta$0b of the rotation stage 14, spectrum line width control gains $\Delta\lambda$ka and $\Delta\lambda$kb, and initial positions X0a and X0b of the linear stage 63.

The server 110 may store, in the data storage unit 120, data of a control parameter before and after the change, which is related to the energy control parameter Peg. The control parameter before and after the change, which is related to the energy control parameter Peg may include pulse energy control gains Vka and Vkb, and initial values V0a and V0b of the charge voltage V.

The server 110 may set, to data of the above-described various types of control parameters stored in the data storage unit 120, authorization that allows reference from, for example, the terminal device 111 used by the maintenance worker of the laser manufacturer. When data of the above-described various types of control parameters stored in the data storage unit 120 is not to be disclosed to the user of the laser apparatus 1, the server 110 may set authorization that disallows reference from the terminal device 112 used by the user.

The above-described various types of control parameters are merely exemplary, and the present invention is not limited to the above-described various types of control parameters. The server 110 may store history data such as a time at which a control parameter is changed and ID of a person in charge who changed the control parameter, in the data storage unit 120 in association with the above-described various types of control parameters.

(Energy Control Related Laser Performance Data Before and After Change)

FIG. 20 schematically illustrates exemplary energy control related laser performance data before and after control parameter change, which is stored in the server 110 in the laser apparatus management system according to Embodiment 2.

The server 110 may store, in the data storage unit 120, the energy control related laser performance data before and after control parameter change. The energy control related laser performance data before and after control parameter change may include data of the target pulse energy Et, pulse energies Ea and Eb, energy stabilities E$\sigma$a and E$\sigma$b, and charge voltages Va and Vb.

The server 110 may store, in the data storage unit 120, the above-described energy control related laser performance data before and after control parameter change in association with a shot number from the start of each adjustment oscillation before and after control parameter change, and elapsed times Ta and Tb from the start time of each adjustment oscillation before and after control parameter change.

The server 110 may set, to the above-described energy control related laser performance data before and after control parameter change, which is stored in the data storage unit 120, authorization that allows reference from, for example, the terminal device 111 used by the maintenance worker of the laser manufacturer. The server 110 may set, to the above-described energy control related laser performance data before and after control parameter change, which is stored in the data storage unit 120, authorization that allows reference from the terminal device 112 used by the user of the laser apparatus 1.

The terminal device 111 can evaluate the laser performance based on the above-described laser performance data read from the data storage unit 120 of the server 110 by, for example, plotting, on the horizontal axis, each shot number before and after control parameter change or the elapsed times Ta and Tb from the start time of each adjustment oscillation before and after control parameter change, and plotting each energy control related laser performance data on the vertical axis. Accordingly, the maintenance worker can analyze, by comparison, a more detailed state of improvement or degradation of the laser performance through the control parameter change.

(Spectrum Control Related Laser Performance Data Before and After Change)

FIG. 21 schematically illustrates exemplary spectrum control related laser performance data before and after control parameter change, which is stored in the server 110 in the laser apparatus management system according to Embodiment 2.

The server 110 may store the spectrum control related laser performance data before and after control parameter change in the data storage unit 120. The spectrum control related laser performance data before and after control parameter change may include data of the target wavelength $\lambda$t, differences $\delta\lambda$a and $\delta\lambda$b from the target wavelength, the wavelength stabilities $\lambda\sigma$a and $\lambda\sigma$b, the target spectrum line width $\Delta\lambda$t, the spectrum line widths $\Delta\lambda$a and $\Delta\lambda$b, and the spectrum line width stabilities $\Delta\lambda\sigma$a and $\Delta\lambda\sigma$b.

The server 110 may store, in the data storage unit 120, the above-described spectrum control related laser performance data before and after control parameter change in association with a shot number from the start of each adjustment oscillation before and after control parameter change, and elapsed times Ta and Tb from the start time of each adjustment oscillation before and after control parameter change.

The server 110 may set, to the above-described spectrum control related laser performance data before and after control parameter change, which is stored in the data storage unit 120, authorization that allows reference from, for example, the terminal device 111 used by the maintenance worker of the laser manufacturer. The server 110 may set, to the above-described spectrum control related laser performance data before and after control parameter change, which is stored in the data storage unit 120, authorization that allows reference from the terminal device 112 used by the user of the laser apparatus 1.

The terminal device 111 can evaluate the laser performance based on the above-described laser performance data read from the data storage unit 120 of the server 110 by, for example, plotting, on the horizontal axis, each shot number before and after control parameter change or the elapsed times Ta and Tb from the start time of each adjustment oscillation before and after control parameter change, and plotting each spectrum control related laser performance data on the vertical axis. Accordingly, the maintenance worker can analyze, by comparison, a more detailed state of improvement or degradation of the laser performance through the control parameter change.

(Gas Control Related Laser Performance Data Before and After Change)

FIG. 22 schematically illustrates exemplary gas control related laser performance data before and after control parameter change in the laser apparatus 1 and the laser apparatus management system according to Embodiment 2.

The server 110 may store, in the data storage unit 120, the gas control related laser performance data before and after control parameter change. The gas control related laser performance data before and after control parameter change may include data of gas pressures Pa and Pb and charge voltages Va and Vb.

The server 110 may store, in the data storage unit 120, the above-described gas control related laser performance data before and after control parameter change in association with a shot number from the start of each adjustment oscillation before and after control parameter change, and the elapsed times Ta and Tb from the start time of each adjustment oscillation before and after control parameter change.

The server 110 may set, to the above-described gas control related laser performance data before and after control parameter change, which is stored in the data storage unit 120, authorization that allows reference from, for example, the terminal device 111 used by the maintenance worker of the laser manufacturer. The server 110 may set, to the above-described gas control related laser performance data before and after control parameter change, which is stored in the data storage unit 120, authorization that allows reference from the terminal device 112 used by the user of the laser apparatus 1.

The terminal device 111 can evaluate the laser performance based on the above-described laser performance data read from the data storage unit 120 of the server 110 by, for example, plotting, on the horizontal axis, each shot number before and after control parameter change or the elapsed times Ta and Tb from the start time of each adjustment oscillation before and after control parameter change, and plotting each gas control related laser performance data on the vertical axis. Accordingly, the maintenance worker can analyze, by comparison, a more detailed state of improvement or degradation of the laser performance through the control parameter change.

The other operation may be substantially same as that of the laser apparatus 1 and the laser apparatus management system according to the comparative example or Embodiment 1 described above.

[3.3 Effect]

With the laser apparatus 1 and the laser apparatus management system according to Embodiment 2, the control parameter data and the laser performance data before and after control parameter change and data of the control parameter change OK signal or the control parameter change NG signal are stored in the server 110, and this detailed data can be browsed from the terminal device 111. As a result, the terminal device 111 can perform comprehensive evaluation of the laser performance through control parameter change. In addition, the terminal device 111 can use the comprehensive evaluation of the detailed data as a valuable information source for further control parameter change to improve the laser performance.

For example, the laser performance data before and after control parameter change can be browsed also from the terminal device 112 used by the user of the laser apparatus 1. Accordingly, the user of the laser apparatus 1 can reflect a result of the control parameter change to an exposure process.

(Other)

Although the laser control unit 2, the terminal device 111, and the terminal device 112 are directly connected with the server 110 in the example in Embodiment 2, they may be connected with the server 110 through a network.

For example, the laser apparatus 1 and the server 110 may be installed in a semiconductor factory. In this case, the server 110, the laser control unit 2, the terminal device 111, and the terminal device 112 may be connected with a network in the semiconductor factory. The terminal device 111 may be connected with the network in the semiconductor factory to transmit data of the reservation control parameter Pr to the laser control unit 2 through the server 110.

The terminal device 111 may be installed in a factory of the laser manufacturer at a place different from the semiconductor factory. The terminal device 111 may be connected with the server 110 in the semiconductor factory through the Internet from the factory of the laser manufacturer to transmit data of the reservation control parameter Pr to the server 110. In this case, no maintenance worker of the laser manufacturer needs to be sent to the semiconductor factory, but the reservation control parameter Pr can be transmitted from a remote place to perform control parameter change at the laser apparatus 1, thereby improving the laser performance of the laser apparatus 1.

When the server 110 is connected with a plurality of laser apparatuses 1, each laser apparatus 1 may be provided with ID. The reservation control parameter Pr may be associated with the ID of a laser apparatus 1 at which control parameter change is performed, and data of the reservation control parameter Pr provided with the ID may be transmitted from the terminal device 111 to the server 110.

The other effect may be substantially same as that of the laser apparatus and the laser apparatus management system according to the comparative example or Embodiment 1 described above.

<4. Other>

The above description is intended to provide not restriction but examples. Thus, the skilled person in the art would clearly understand that the embodiments of the present disclosure may be changed without departing from the scope of the claims.

The terms used throughout the specification and the appended claims should be interpreted as "non-limiting". For example, the term "comprising" or "comprised" should be interpreted as "not limited to what has been described as being comprised". The term "having" should be interpreted as "not limited to what has been described as having". It should be understood that the indefinite article "a/an" in the present specification and the claims means "at least one" or "one or more".

What is claimed is:

1. A laser apparatus comprising:
a laser output unit configured to perform laser oscillation; and
a control unit configured to acquire first laser performance data obtained when the laser output unit performs laser oscillation based on a first laser control parameter, and second laser performance data obtained when the laser output unit performs laser oscillation based on a second laser control parameter, while laser output from the laser output unit to an external device is stopped, and determine whether the second laser performance data has been improved as compared to the first laser performance data, wherein
the control unit causes, based on a result of the determination, the laser output unit to perform laser output to the external device by using one of the first laser control parameter and the second laser control parameter, and
when having determined that the second laser performance data has been improved, the control unit causes the laser output unit to perform laser output to the external device by using the second laser control parameter.

2. The laser apparatus according to claim 1, wherein, when having determined that the second laser performance data has not been improved, the control unit causes the laser output unit to perform laser output to the external device by using the first laser control parameter.

3. The laser apparatus according to claim 1, wherein
the laser output unit includes an optical resonator, and a laser chamber that is disposed in the optical resonator and to which laser gas is supplied, and outputs a pulse laser beam, and
the first laser control parameter and the second laser control parameter each include at least one of:
an energy control parameter related to control of the pulse energy of the pulse laser beam;
a spectrum control parameter related to control of the spectrum of the pulse laser beam; and
a gas control parameter related to control of the laser gas.

4. The laser apparatus according to claim 1, wherein the first laser control parameter and the second laser control parameter are target control parameters for causing laser performance of the laser apparatus to become closer to target performance required by the external device.

5. The laser apparatus according to claim 1, further comprising:
a first storage unit configured to store the first laser control parameter; and
a second storage unit configured to store the second laser control parameter.

6. The laser apparatus according to claim 5, wherein, before laser output from the laser output unit to the external device is stopped, the control unit receives the second laser control parameter from a terminal device through a server connected with the terminal device and stores the received second laser control parameter in the second storage unit.

7. The laser apparatus according to claim 1, wherein the first laser control parameter is a laser control parameter used before laser output from the laser output unit to the external device is stopped.

8. The laser apparatus according to claim 1, further comprising a performance data transmission unit configured to transmit the first laser performance data and the second laser performance data to a terminal device through a server connected with the terminal device.

9. A laser apparatus comprising:
a laser output unit configured to perform laser oscillation;
a control unit configured to acquire first laser performance data obtained when the laser output unit performs laser oscillation based on a first laser control parameter, and second laser performance data obtained when the laser output unit performs laser oscillation based on a second laser control parameter, while laser output from the laser output unit to an external device is stopped, and determine whether the second laser performance data has been improved as compared to the first laser performance data;
a first storage unit configured to store the first laser control parameter; and
a second storage unit configured to store the second laser control parameter,
wherein the control unit receives the second laser control parameter from a terminal device and stores the received second laser control parameter in the second storage unit before laser output from the laser output unit to the external device is stopped.

10. The laser apparatus according to claim 9, wherein the control unit causes, based on a result of the determination, the laser output unit to perform laser output to the external device by using one of the first laser control parameter and the second laser control parameter.

11. The laser apparatus according to claim 10, wherein
the laser output unit includes an optical resonator, and a laser chamber that is disposed in the optical resonator and to which laser gas is supplied, and outputs a pulse laser beam, and
the first laser control parameter and the second laser control parameter each include at least one of:
an energy control parameter related to control of the pulse energy of the pulse laser beam;
a spectrum control parameter related to control of the spectrum of the pulse laser beam; and
a gas control parameter related to control of the laser gas.

12. The laser apparatus according to claim 9, wherein the first laser control parameter and the second laser control parameter are target control parameters for causing laser performance of the laser apparatus to become closer to target performance required by the external device.

13. The laser apparatus according to claim 9, wherein, before laser output from the laser output unit to the external device is stopped, the control unit receives the second laser control parameter from the terminal device through a server connected with the terminal device and stores the received second laser control parameter in the second storage unit.

14. The laser apparatus according to claim 9, wherein the first laser control parameter is a laser control parameter used before laser output from the laser output unit to the external device is stopped.

15. The laser apparatus according to claim 9, further comprising a performance data transmission unit configured to transmit the first laser performance data and the second laser performance data to the terminal device through a server connected with the terminal device.

16. A laser apparatus management system comprising:
a laser apparatus; and
a terminal device configured to manage the laser apparatus,
wherein the laser apparatus includes:
a laser output unit configured to perform laser oscillation; and
a control unit configured to acquire first laser performance data obtained when the laser output unit performs laser oscillation based on a first laser control parameter, and second laser performance data obtained when the laser output unit performs laser oscillation based on a second laser control parameter, while laser output from the laser output unit to an external device is stopped, and determine whether the second laser performance data has been improved as compared to the first laser performance data, and
wherein the second laser control parameter is transmitted from the terminal device before laser output from the laser output unit to the external device is stopped.

17. The laser apparatus management system according to claim 16, further comprising a server connected with the terminal device, wherein the second laser control parameter is transmitted from the terminal device through the server before laser output from the laser output unit to the external device is stopped.

18. The laser apparatus management system according to claim 17, wherein the server includes a control parameter storage unit configured to store the second laser control parameter transmitted from the terminal device.

19. The laser apparatus management system according to claim 17, wherein
the laser apparatus further includes a performance data transmission unit configured to transmit the first laser performance data and the second laser performance data to the server, and
the server further includes a performance data storage unit configured to store the first laser performance data and the second laser performance data transmitted from the performance data transmission unit.

20. A laser apparatus management method comprising:
acquiring, by a control unit, first laser performance data obtained when a laser output unit performs laser oscillation based on a first laser control parameter, and second laser performance data obtained when the laser output unit performs laser oscillation based on a second laser control parameter, while laser output from the laser output unit to an external device is stopped at a laser apparatus;
determining, by the control unit, whether the second laser performance data has been improved as compared to the first laser performance data;
receiving, by the control unit, the second laser control parameter from a terminal device before laser output from the laser output unit to the external device is stopped; and
storing, by the control unit, the received second laser control parameter in a storage unit.

21. The laser apparatus management method according to claim 20, further comprising:
receiving, by the control unit, the second laser control parameter from the terminal device through a server connected with the terminal device before laser output from the laser output unit to the external device is stopped; and storing, by the control unit, the received second laser control parameter in a storage unit.

22. A laser apparatus management method comprising:

acquiring, by a control unit, first laser performance data obtained when a laser output unit performs laser oscillation based on a first laser control parameter, and second laser performance data obtained when the laser output unit performs laser oscillation based on a second laser control parameter, while laser output from the laser output unit to an external device is stopped at a laser apparatus; and determining, by the control unit, whether the second laser performance data has been improved as compared to the first laser performance data, wherein the first laser control parameter is a laser control parameter used before laser output from the laser output unit to the external device is stopped.

23. A laser apparatus comprising:

a laser output unit configured to perform laser oscillation; and a control unit configured to acquire first laser performance data obtained when the laser output unit performs laser oscillation based on a first laser control parameter, and second laser performance data obtained when the laser output unit performs laser oscillation based on a second laser control parameter, while laser output from the laser output unit to an external device is stopped, and determine whether the second laser performance data has been improved as compared to the first laser performance data, wherein the control unit causes, based on a result of the determination, the laser output unit to perform laser output to the external device by using one of the first laser control parameter and the second laser control parameter, and when having determined that the second laser performance data has not been improved, the control unit causes the laser output unit to perform laser output to the external device by using the first laser control parameter.

24. The laser apparatus according to claim 23, wherein the laser output unit includes an optical resonator, and a laser chamber that is disposed in the optical resonator and to which laser gas is supplied, and outputs a pulse laser beam, and the first laser control parameter and the second laser control parameter each include at least one of:

an energy control parameter related to control of the pulse energy of the pulse laser beam;

a spectrum control parameter related to control of the spectrum of the pulse laser beam; and a gas control parameter related to control of the laser gas.

25. The laser apparatus according to claim 23, wherein the first laser control parameter and the second laser control parameter are target control parameters for causing laser performance of the laser apparatus to become closer to target performance required by the external device.

26. The laser apparatus according to claim 23, further comprising:

a first storage unit configured to store the first laser control parameter; and a second storage unit configured to store the second laser control parameter.

27. The laser apparatus according to claim 26, wherein, before laser output from the laser output unit to the external device is stopped, the control unit receives the second laser control parameter from a terminal device through a server connected with the terminal device and stores the received second laser control parameter in the second storage unit.

28. The laser apparatus according to claim 23, wherein the first laser control parameter is a laser control parameter used before laser output from the laser output unit to the external device is stopped.

29. The laser apparatus according to claim 23, further comprising a performance data transmission unit configured to transmit the first laser performance data and the second laser performance data to a terminal device through a server connected with the terminal device.

* * * * *